Figure 29:
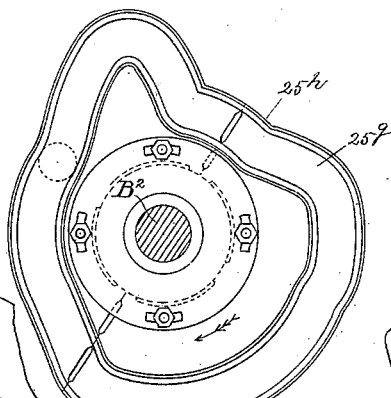
Figure 30:
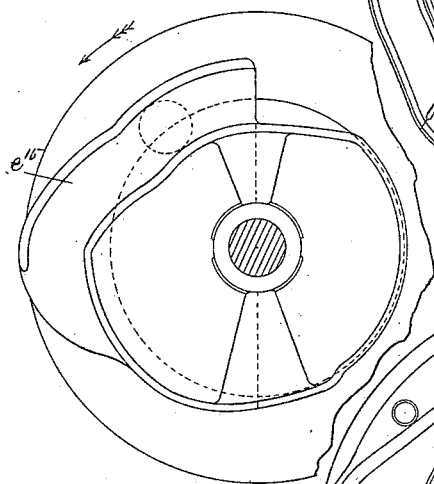
Figure 31:
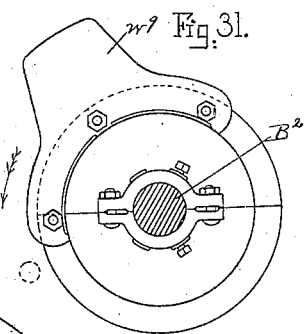
Figure 32:
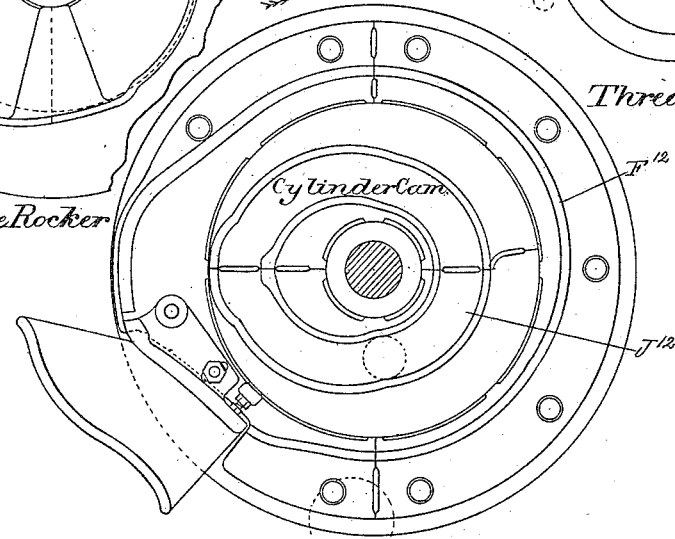

(No Model.) 15 Sheets—Sheet 1.
H. WYMAN & J. A. CLARK.
LOOM FOR WEAVING TUFTED PILE FABRICS.
No. 446,402. Patented Feb. 10, 1891.
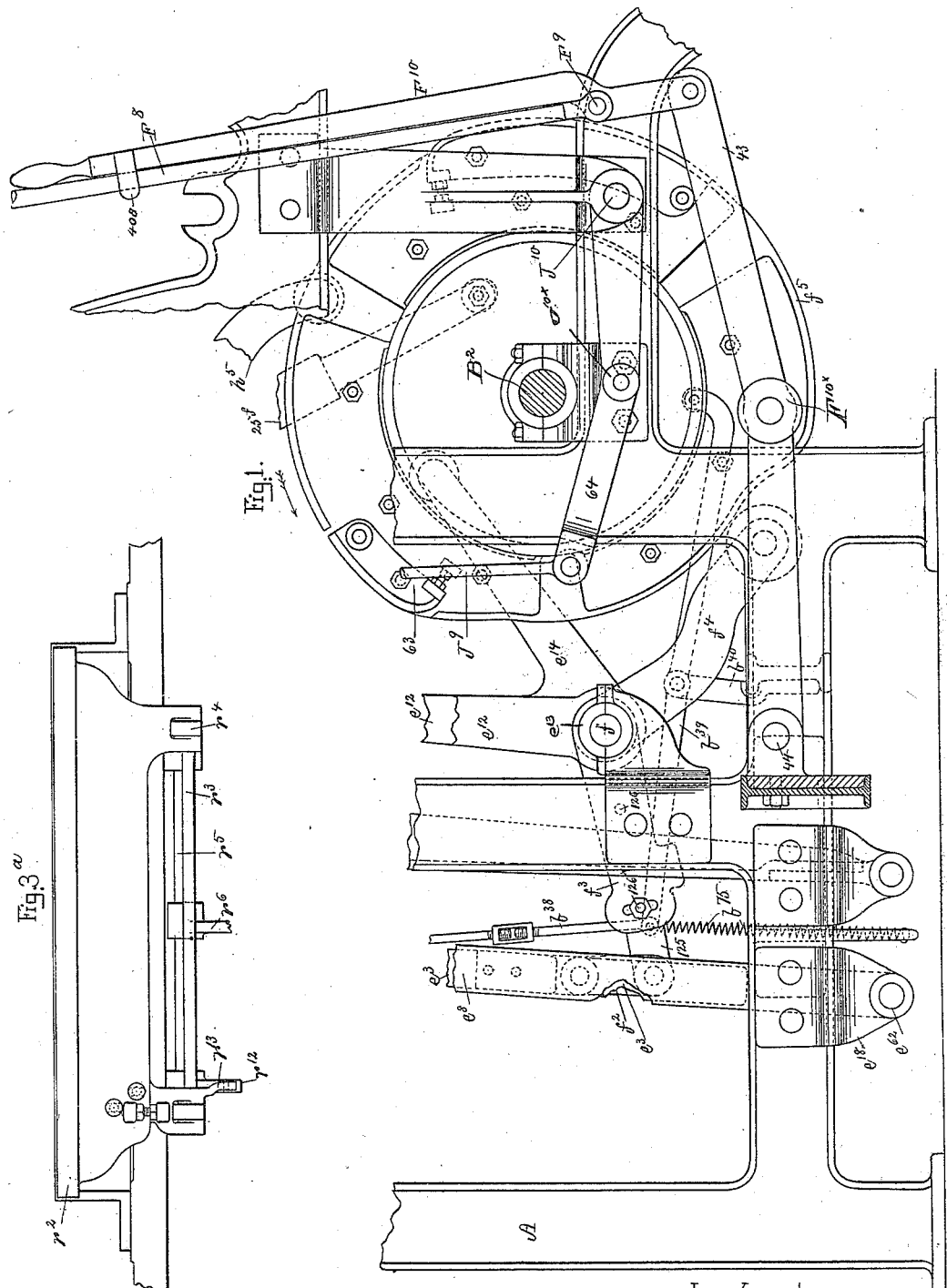

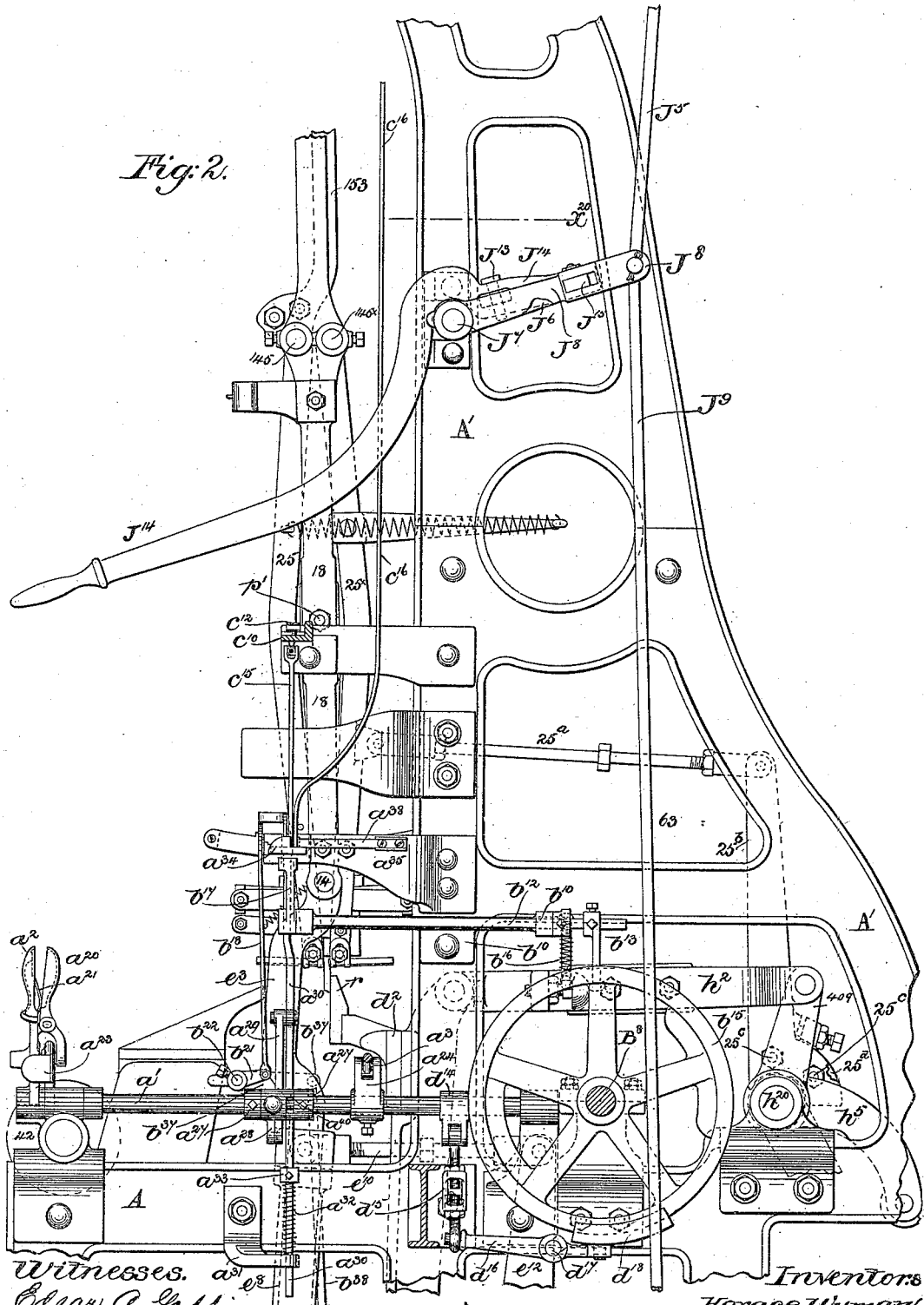

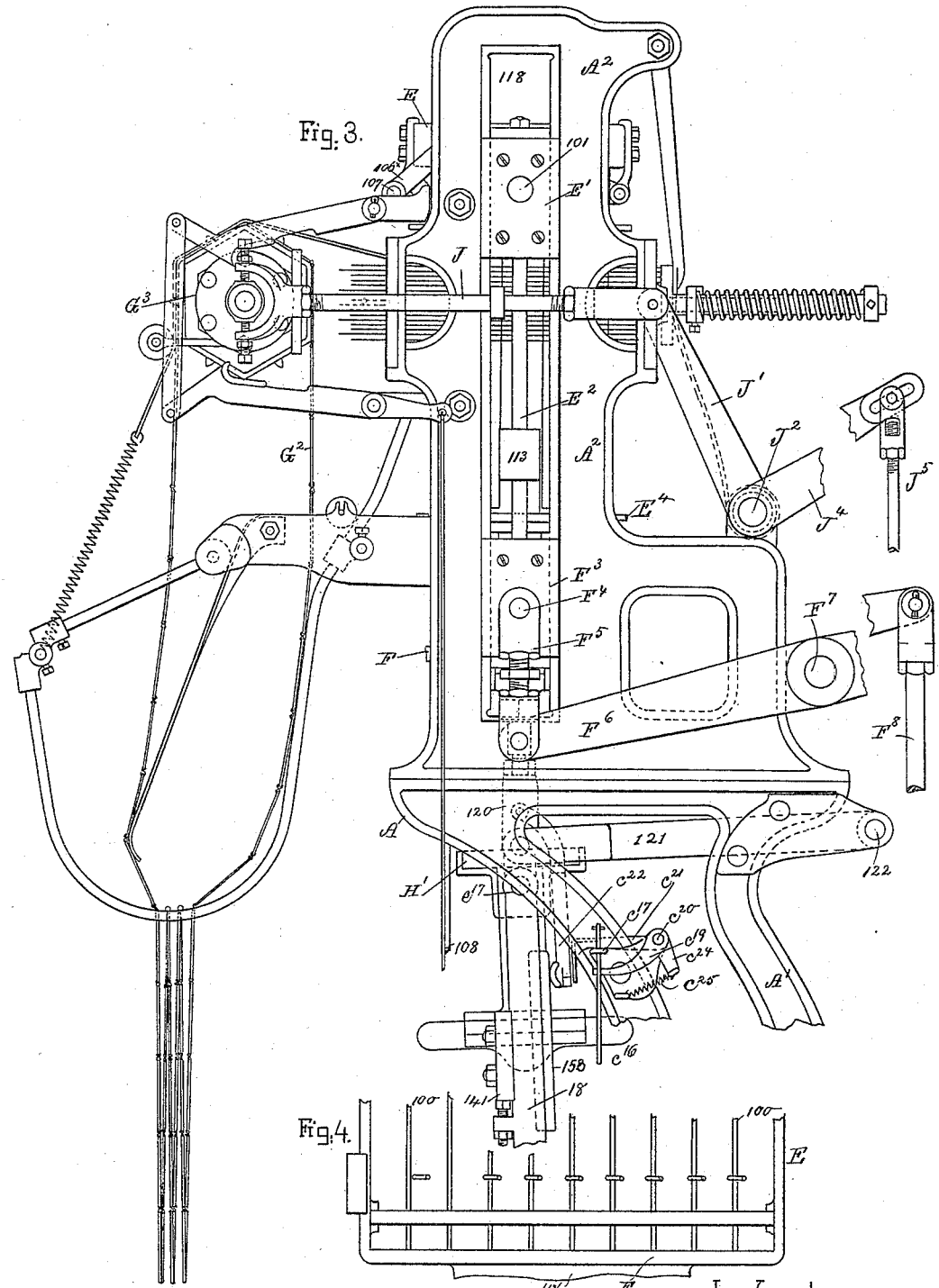

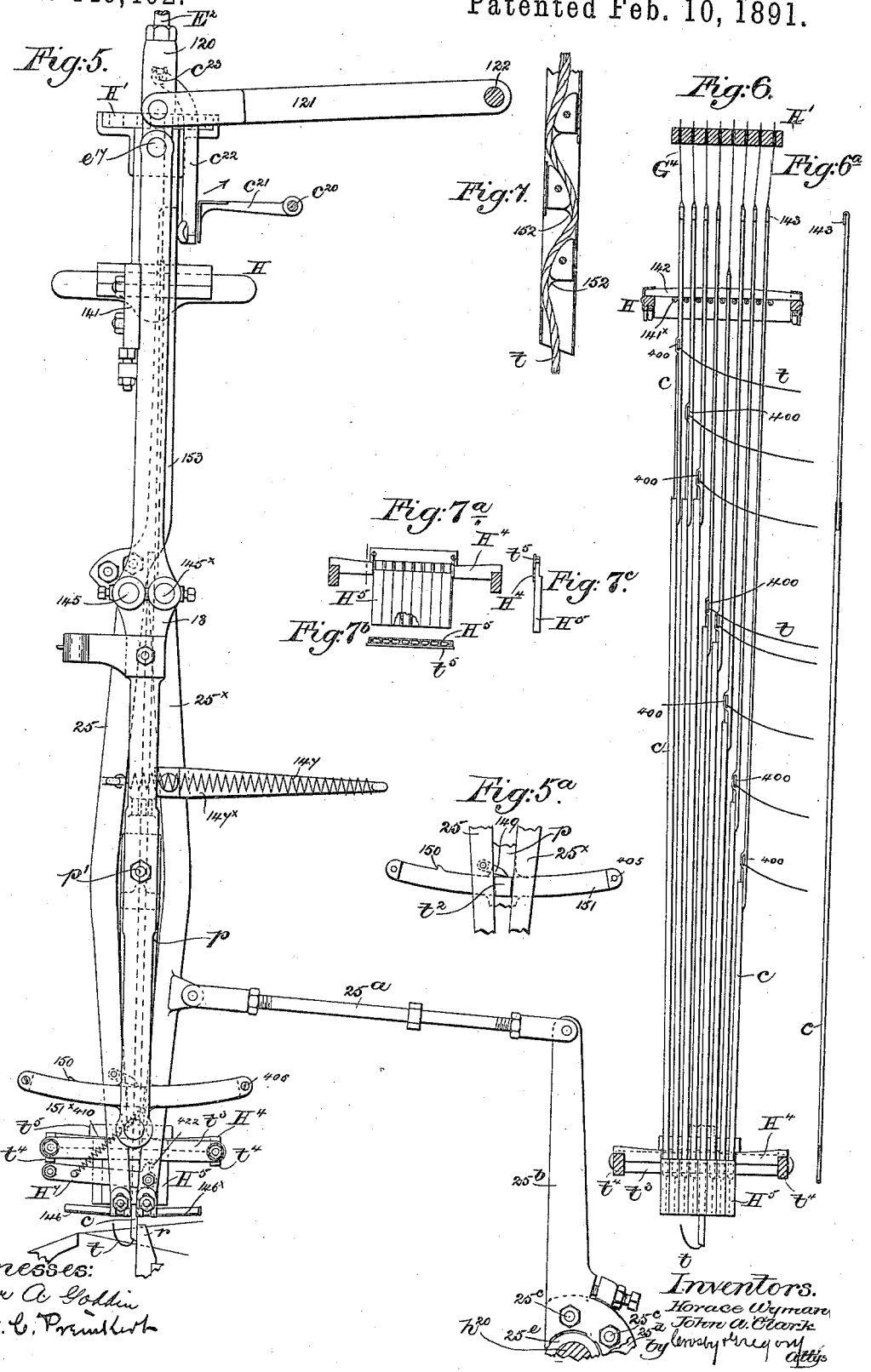

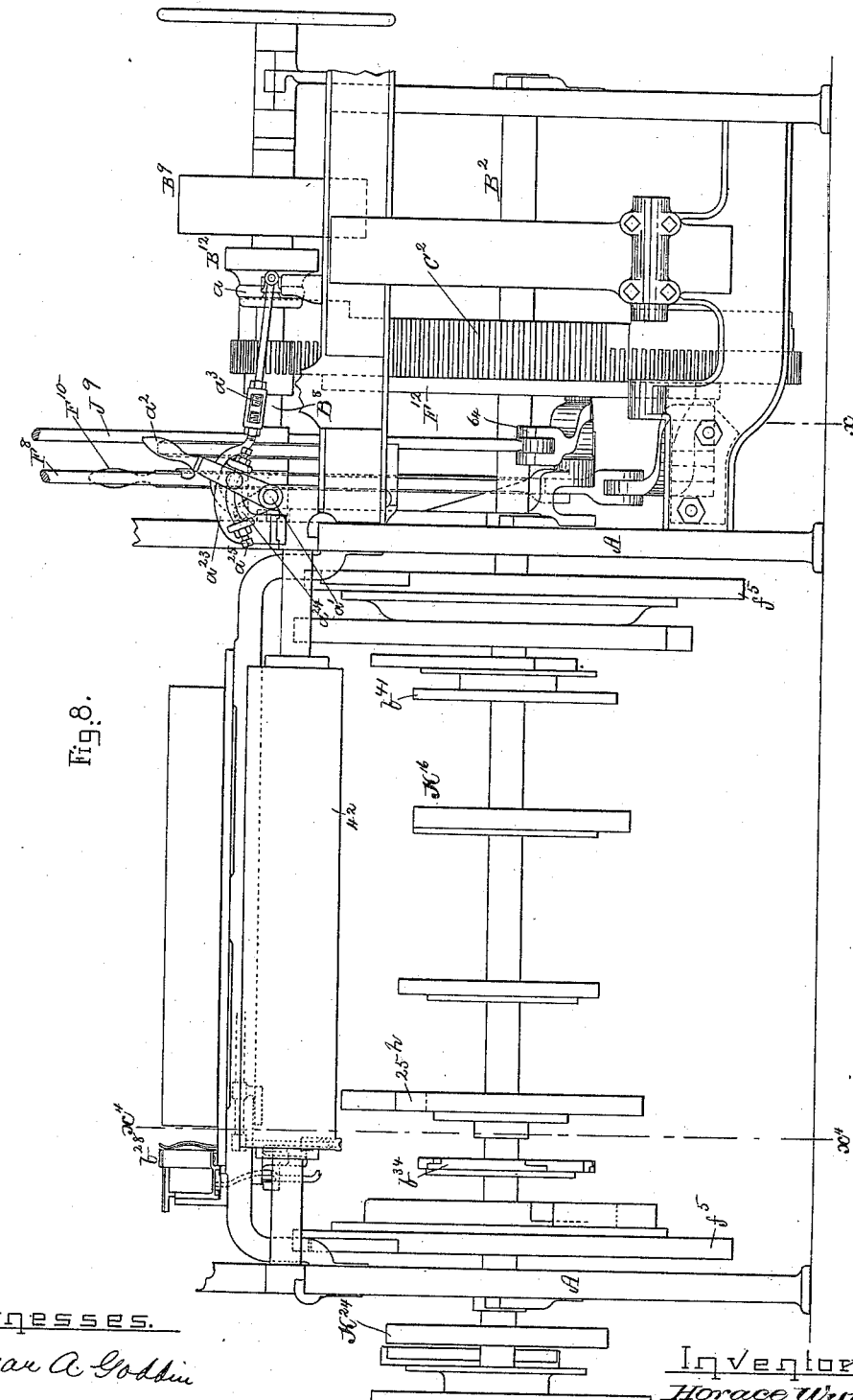

(No Model.)
15 Sheets—Sheet 6.
H. WYMAN & J. A. CLARK.
LOOM FOR WEAVING TUFTED PILE FABRICS.
No. 446,402. Patented Feb. 10, 1891.
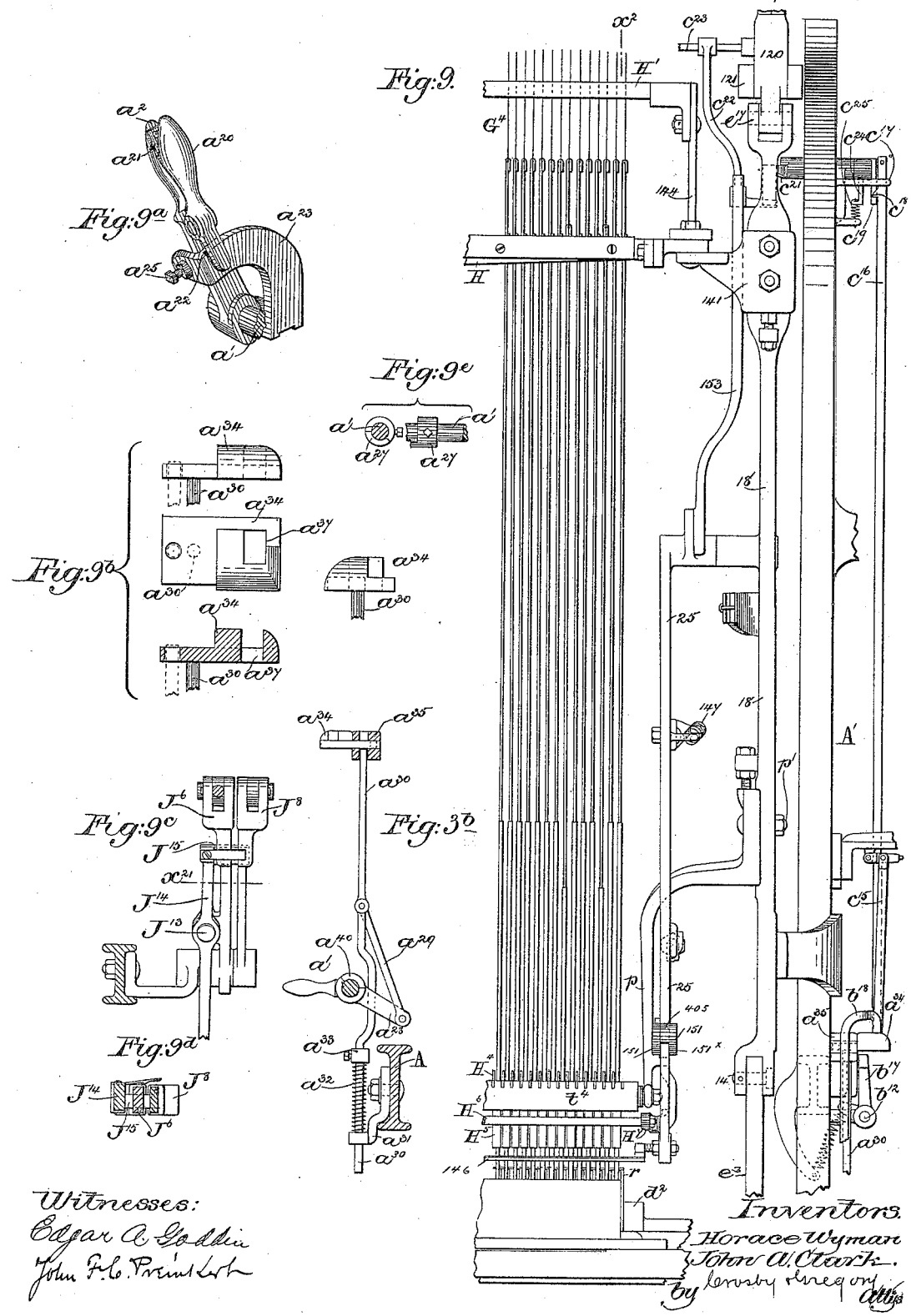

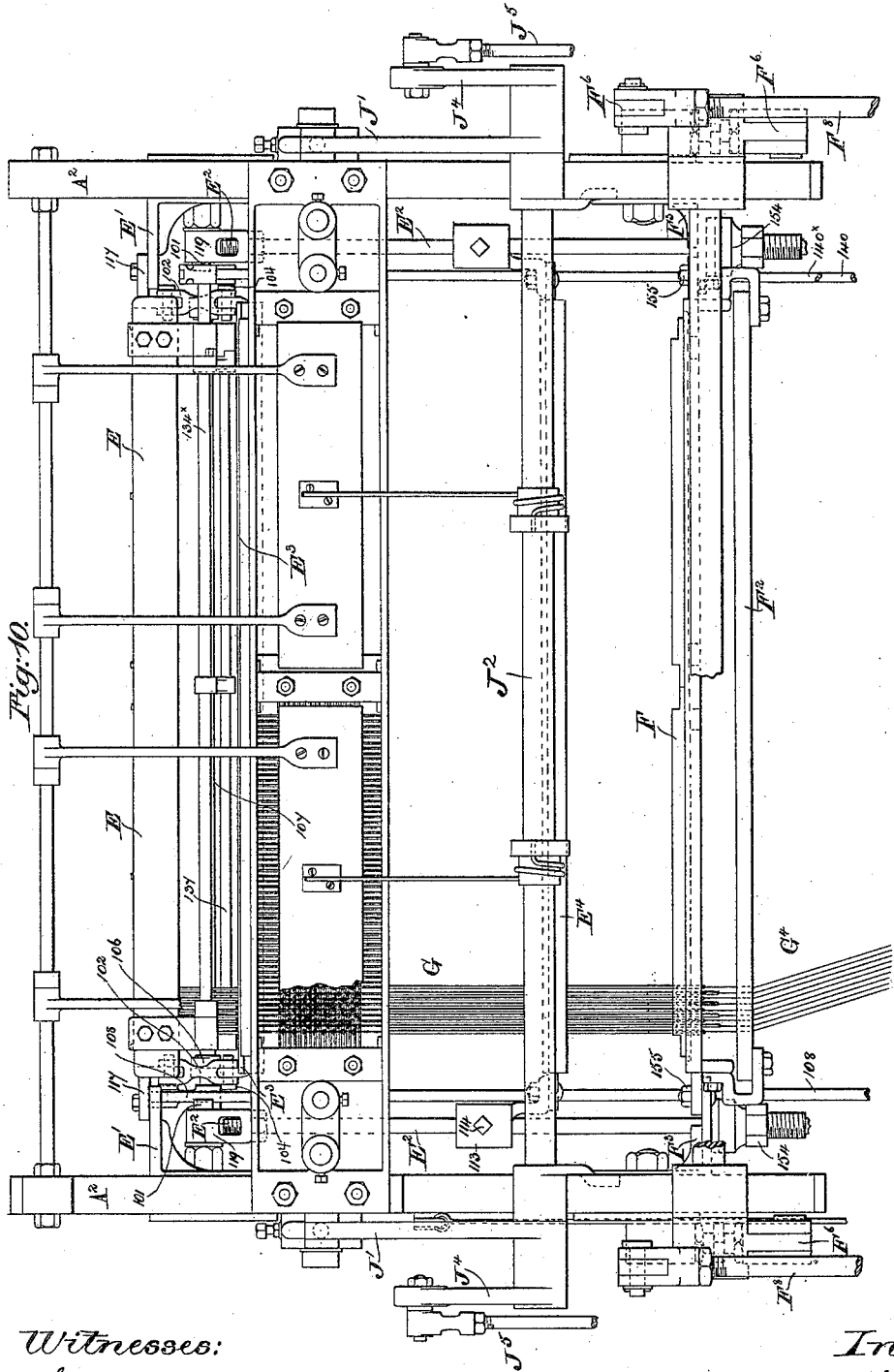

(No Model.) 15 Sheets—Sheet 8.
H. WYMAN & J. A. CLARK.
LOOM FOR WEAVING TUFTED PILE FABRICS.
No. 446,402. Patented Feb. 10, 1891.
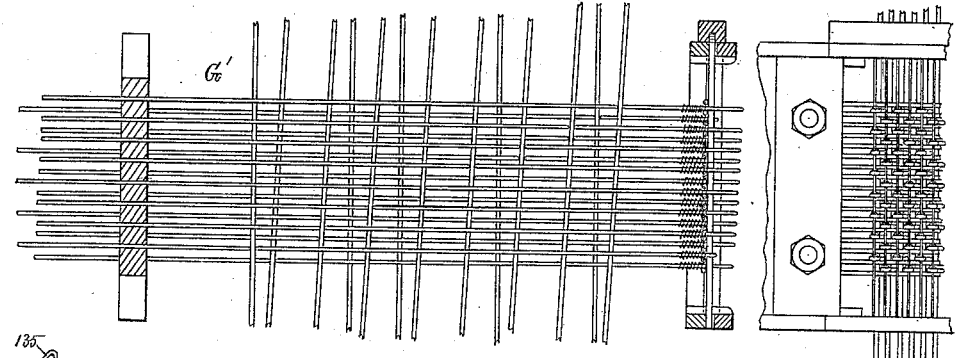
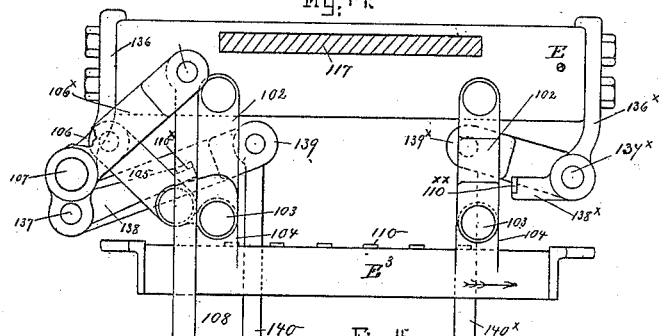
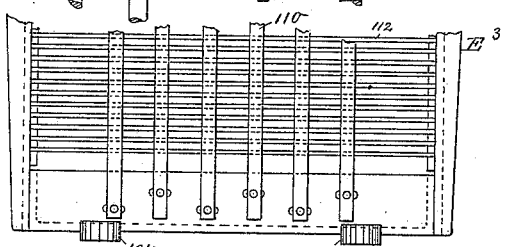
Witnesses.
Edgar A. Goddin
John F. C. Prentiss
Inventors.
Horace Wyman
John A. Clark
By Crosby & Gregory
Attys.

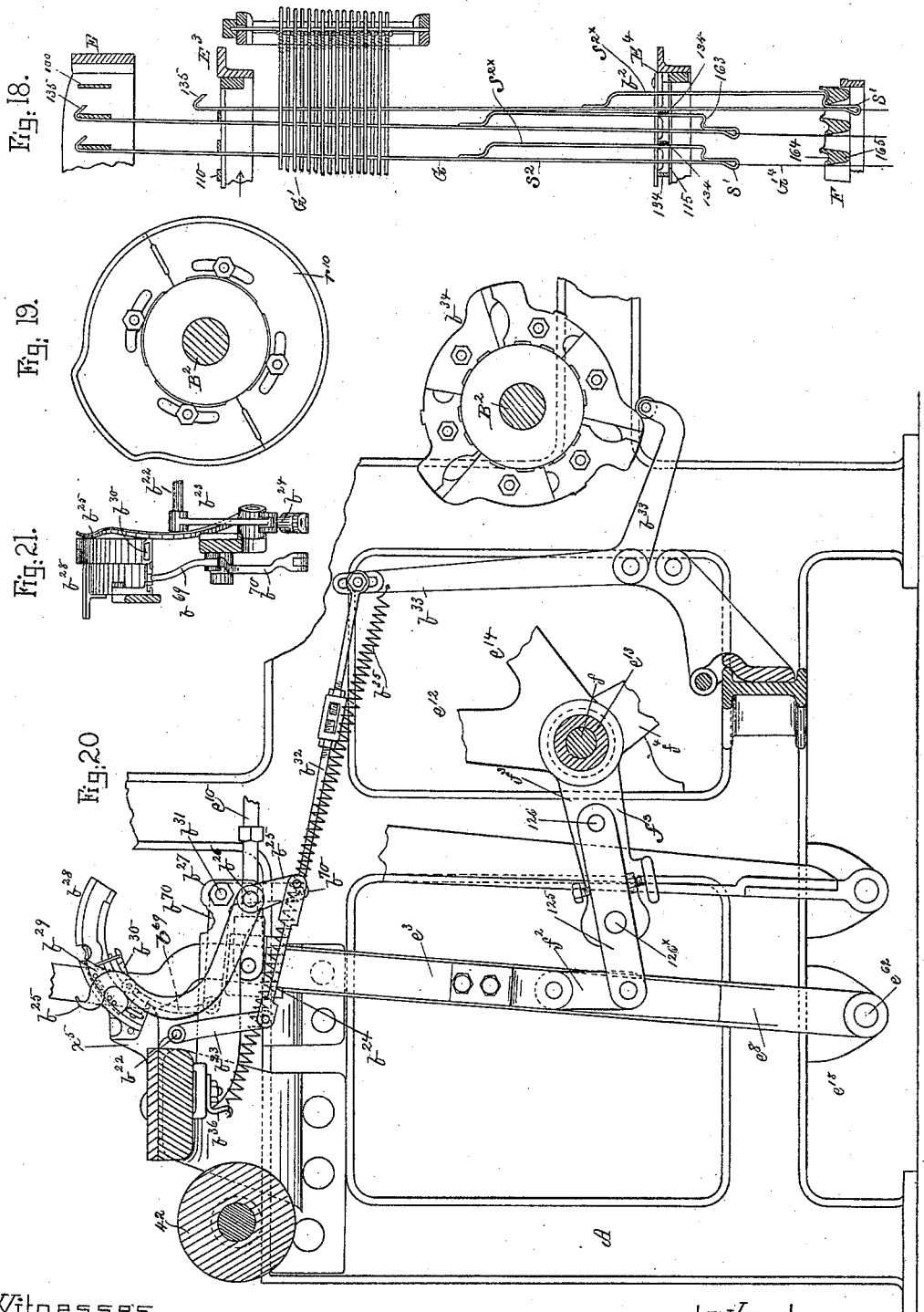

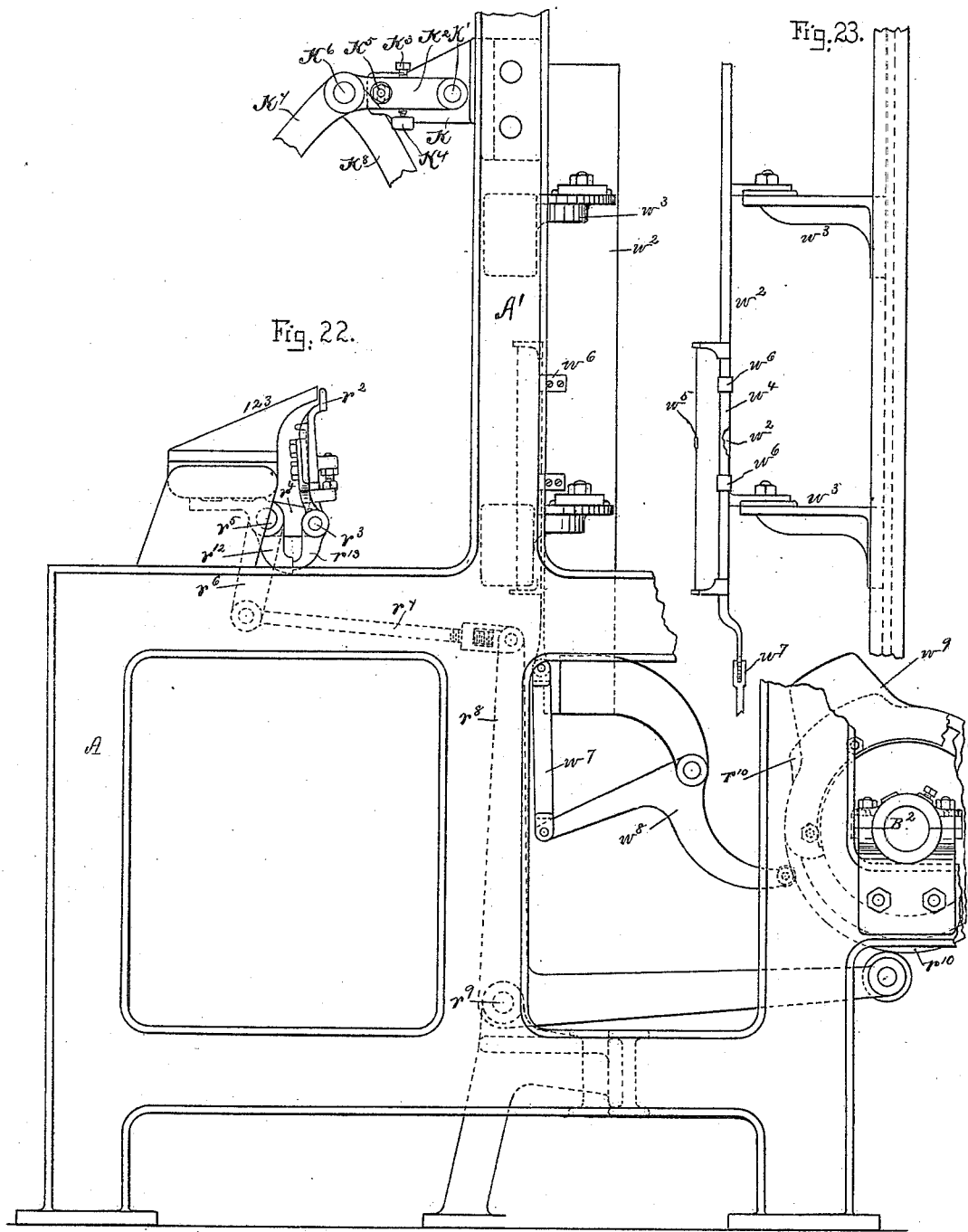

(No Model.) 15 Sheets—Sheet 11.
H. WYMAN & J. A. CLARK.
LOOM FOR WEAVING TUFTED PILE FABRICS.
No. 446,402. Patented Feb. 10, 1891.
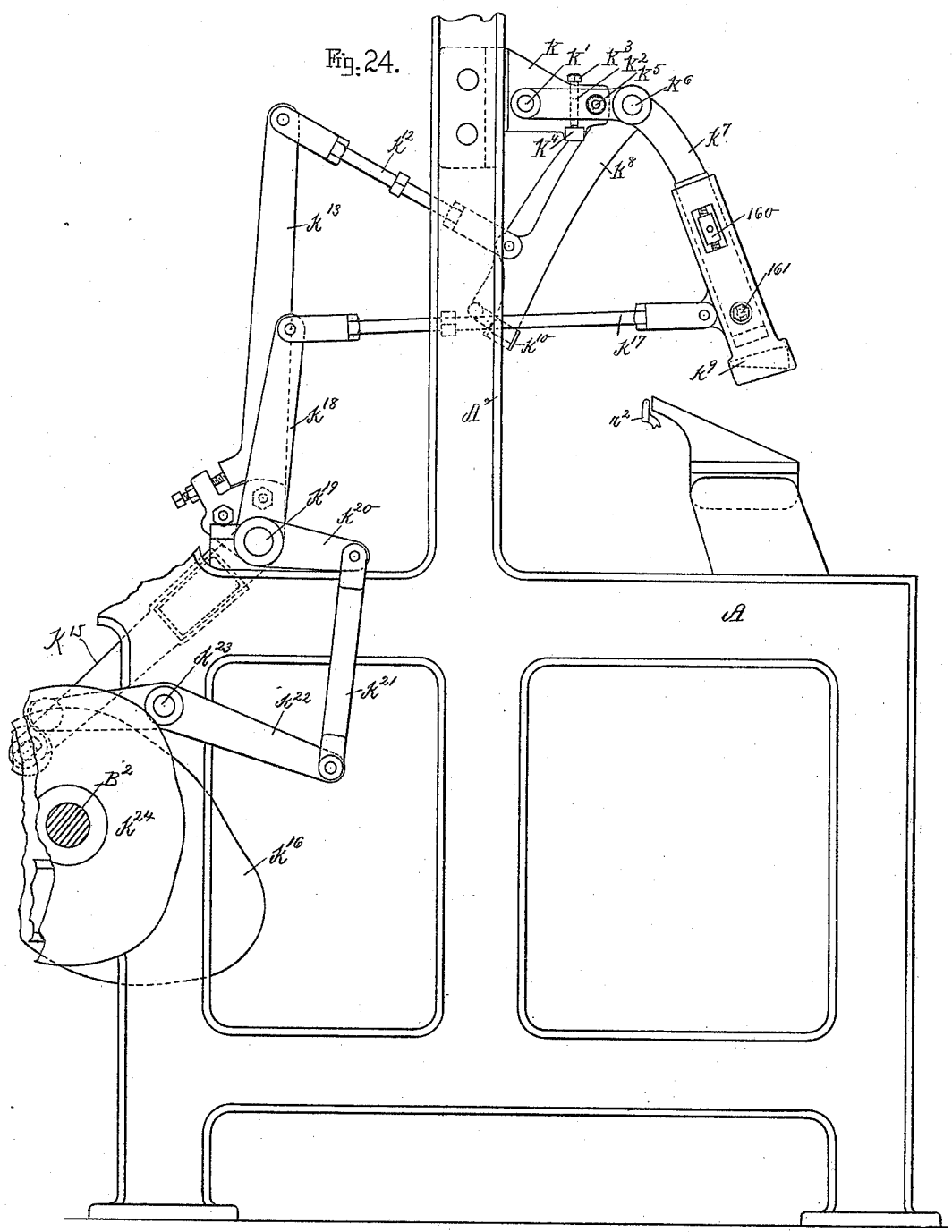

(No Model.) 15 Sheets—Sheet 12.
H. WYMAN & J. A. CLARK.
LOOM FOR WEAVING TUFTED PILE FABRICS.
No. 446,402. Patented Feb. 10, 1891.
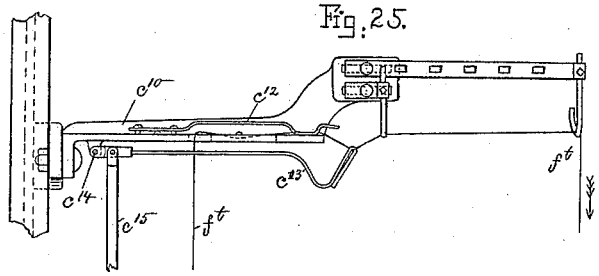
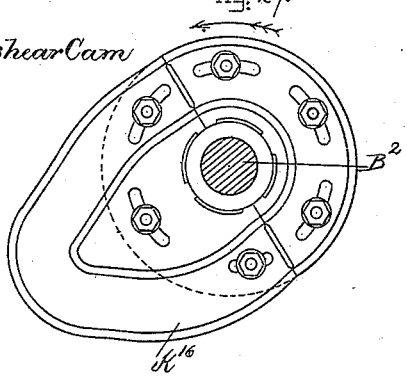
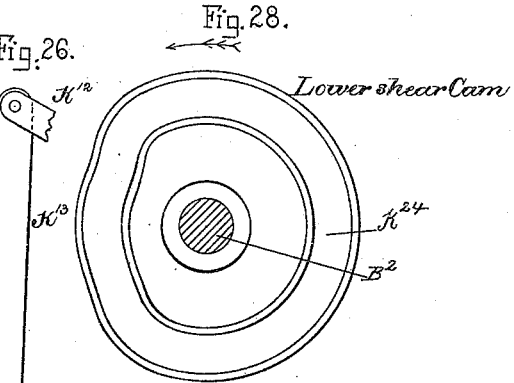
Witnesses.
Edgar A. Goddin
John F. C. Preinkert
Inventors
Horace Wyman
John A. Clark
by Crosby Gregory
attys (No Model.) H. WYMAN & J. A. CLARK. 15 Sheets—Sheet 13.
LOOM FOR WEAVING TUFTED PILE FABRICS.
No. 446,402. Patented Feb. 10, 1891.

Evener Cam.

Lifting Frame Rocker Cam.

Thread Lifter Cam.

Cylinder Cam.
Lower board Cam.

Witnesses.
Edgar A. Godden
John F. C. Porinkert

Inventors
Horace Wyman
John A. Clark
By Crosby & Gregory
Attys.

(No Model.) 15 Sheets—Sheet 14.

H. WYMAN & J. A. CLARK.
LOOM FOR WEAVING TUFTED PILE FABRICS.

No. 446,402. Patented Feb. 10, 1891.

Lay Cam.

Shuttle Cam.

Shuttle Stop-motion Cam.

Heavy Lift Cam.

Witnesses.
Edgar A. Godden
John F. L. Parmharst

Inventors.
Horace Wyman
John A. Clark.
by Crosby & Gregory
attys.

(No Model.) 15 Sheets—Sheet 15.
H. WYMAN & J. A. CLARK.
LOOM FOR WEAVING TUFTED PILE FABRICS.
No. 446,402. Patented Feb. 10, 1891.
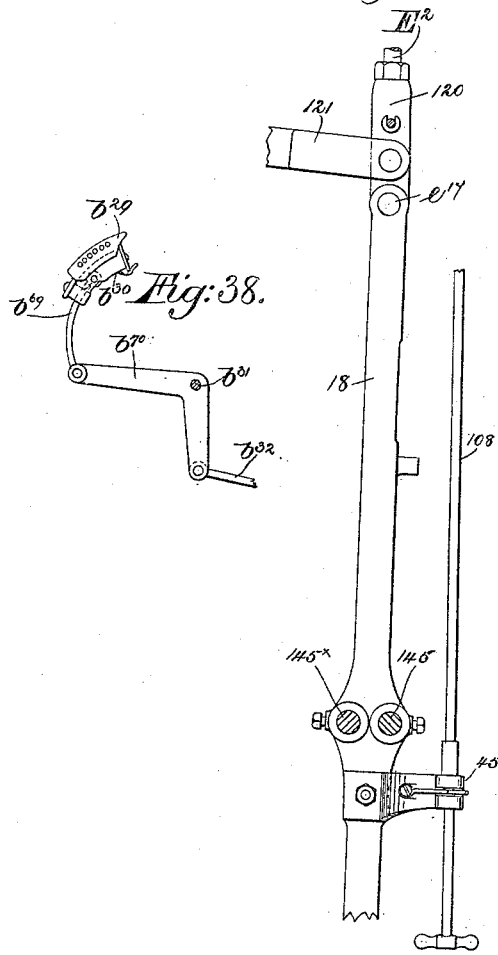
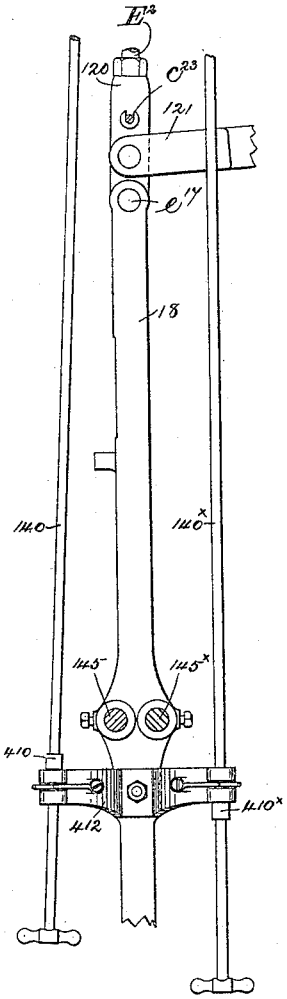
Fig. 40.  Fig. 41.  Fig. 38.  Fig. 39.
Witnesses:
Edgar A. Godden
Edward F. Allen
Inventors.
Horace Wyman,
John A. Clark,
by Crosby Gregory
Attys

UNITED STATES PATENT OFFICE.

HORACE WYMAN AND JOHN A. CLARK, OF WORCESTER, MASSACHUSETTS, ASSIGNORS TO THE CROMPTON LOOM WORKS, OF SAME PLACE.

LOOM FOR WEAVING TUFTED PILE FABRICS.

SPECIFICATION forming part of Letters Patent No. 446,402, dated February 10, 1891.

Application filed May 6, 1890. Serial No. 350,774. (No model.)

*To all whom it may concern:*

Be it known that we, HORACE WYMAN and JOHN A. CLARK, of Worcester, county of Worcester, State of Massachusetts, have invented an Improvement in Looms for Weaving Tufted Pile Fabrics, of which the following description, in connection with the accompanying drawings, is a specification, like letters on the drawings representing like parts.

This invention has for its object to improve and simplify looms of the class shown in United States Patent No. 343,110, dated June 1, 1886, the said loom in turn being an improvement upon that described in United States Patent No. 245,259, dated August 2, 1881, the tufted fabric to be produced by the loom herein shown to be described being the same as that more fully illustrated in the patent No. 245,259.

The improvements herein to be described may be stated, briefly, as follows, viz: One improvement relates to the tuft-carrying needles, another to the means employed for suspending the said needles, and another to the pocketed carriages which receive the lower ends of the needles and control their movement in the direction of the length of the warp, and to means for supporting the said pocketed carriages. The mechanism for moving the eveners for acting upon the needles which are dropped preparatory to inserting a row of tufts has been improved and the eveners have been broadened, so that they act to support any of the needles which are not selected to be employed for inserting a row of tufts, provided the cords supporting the said needles which are not so selected should for any reason become broken or slack and the said needles should drop. The loom has also been provided with stop-motion devices to stop the loom in case the selvage-shuttle thread breaks, to stop the loom in case the filling-thread breaks, and to stop the loom in case by accident two needles should be dropped so that their lower ends protrude below the lower side of any one pocket. The loom has also been provided with means whereby the pattern-cylinder may be readily turned back or rotated by hand in one or the other direction while the main shaft of the loom remains at rest.

The tuft-yarn cutters in the machine have been mounted upon arms having a common pivot, and both cutters are actuated positively, the fulcra of the arms carrying the blades being adjustable, and, preferably, also, the blades are adjustable on their arms to thus enable the blades to cut the tufts just of the proper length. The machine has also been provided with a fabric-lifter to strike against the under side of the fabric substantially at the fell and lift it so that the back of the fabric will always occupy a certain defined predetermined position preparatory to cutting off the tuft-yarns, thus to insure uniformity in the length of the tufts, thus improving the quality and appearance of the fabric and obviating waste of tuft-yarn. The jacquard employed herein has also been improved, in order that the tail-cords may be attached to hooks composed of wire, and improved mechanism has been added to the loom for operating the said hooks not only for lifting them, but also for guiding them so that they cannot twist or turn sidewise. Means have also been provided whereby all the hooks which are connected to and support the tuft-yarn carriers or needles may be moved independently of the Jacquard needles and placed in position to be engaged by the griffs or bars of the top board, the hooks being kept in engagement with the said griffs for any desired number of picks, and during such time the loom will produce from the backing or jute part of the warp and the weft inserted double what is called a "heading" or "untufted" part, to be cut through when it is desired to sever the fabric into pieces and leave a part which will not unravel, the headings forming ends for the pieces. While weaving the heading the tuft-yarn carriers continue to rise and fall with the top board; but they are not lowered far enough to put the trailing ends of the tuft-yarns into the shed.

To enable a border to be woven, provision has been made to engage some of the rows of hooks referred to with the griffs of the top board and leave one or more rows with their shouldered lower ends in engagement with the lower lifting-board, so that all the needles connected to that row or rows of hooks may be used in a bank to form row after row of tufts. While the jute or back warp and the filling inserted double are being interwoven to form a heading, the said warps will be shed by usual shed-forming devices common to the patents aforesaid and to usual body Brussels or tapestry looms, we preferring to use three harness-frames for such purpose.

Figure 1 is a view of some of the parts of a loom embodying this invention, looking from the right-hand side thereof, the section being just outside the frame-work and substantially in the dotted line $x$ of Fig. 8, the levers 43 and 64 with their respective rolls being shown in elevation. Fig. 2 is also a partial view of the right-hand end of the loom; and Fig. 3 is yet another partial view of the right-hand end of the loom, said Figs. 1, 2, and 3, taken together, showing most of the parts to be described herein as improvements, which parts would show in elevation at the left of the line $x$, Fig. 8. Fig. $3^a$, Sheet 1, is a detail of the cloth-lifter, looking from the crank shaft or lay; Fig. $3^b$, Sheet 6, a detail to be described. Fig. 4 is a partial top view of the top board, having the griffs or bars, upon which hang the hooks from which are suspended those needles which are not to be lowered to insert the yarns carried by them in the transverse row of tufts then to be formed. Fig. 5 is a detail showing the devices instrumental in moving the needles and pocketed carriages, together with the eveners, their actuating devices, and a part of the reed. Fig. $5^a$ is a detail showing parts of levers 25 and $25^x$ and the stop for connecting the lever 25. Fig. 6 is a section in the line $x^2$, Fig. 9, looking from the right. Fig. $6^a$ shows one of the tuft-yarn carriers or needles in edge view. Fig. 7 is an enlarged longitudinal section of the lower end of one of the tuft-yarn carriers or needles, showing the devices therein for preventing slipping of the tuft-yarn. Figs. $7^a$, $7^b$, and $7^c$ are different views of the carriage having the pockets for the needles. Fig. 8 is a partial front elevation of the loom, the levers acted upon by the cams on the cam-shaft being omitted because the said levers are shown in detail in other views. Fig. 9 is a partial front elevation of part of the loom above the parts shown in Fig. 8 and as if viewing Fig. 2 from the left; Fig. $9^a$, a detail showing the shipper-handle and some of its co-operating parts; Fig. $9^b$, details showing the slide-block through which move the legs forming parts of the different stop-motions to be described, the block and rod $a^{30}$ in full lines being in the position occupied by them when the loom is running, the dotted lines showing the upper end of the rod as having entered the block, as it does after the loom has been stopped automatically; Fig. $9^c$, a detail below the line $x^{20}$, Fig. 2, chiefly to show the connections between the rods $J^5$ and $J^9$; Fig. $9^d$, a section in the line $x^{21}$, Fig. $9^c$. Fig. $9^e$ is a detail showing part of the shipper-shaft and its notched collars. Fig. 10 is a partial view of the jacquard portion of the loom looking at it from the right in Fig. 3. Fig. 11 is a vertical sectional detail taken through the Jacquard needles which are acted upon by the Jacquard cylinder to shift the hooks, only a portion of the said hooks being shown in the said figure because they are fully illustrated in Fig. 18. Fig. 12 is a right-hand end elevation of the parts shown in Fig. 11. Fig. 13 shows one of the Jacquard needles detached with the spring upon it, and also a portion of one end of one needle with the spring removed. Fig. $13^a$ shows a modified form of hook G. Fig. 14 is a detail showing part of the top board with the hook-locking board pivoted thereto. Fig. 15 is a partial top view or plan of the hook-locking board. Fig. 16 is a partial top view or plan of the part of the lower hook-board. Fig. 17 is a section in the line $x^3$, Fig. 16, one of the hooks being partially shown in both of said figures. Fig. 18 is a detail showing the top hook-board, the lower hook-board, the hook-locking board, and the hook guide-board in section, together with some of the Jacquard needles shown broken off, some of the hooks being shown in elevation with tail-cords attached. Fig. 19 is a detail showing the cam for actuating the cloth-lifting devices. Fig. 20 is a sectional detail in the line $x^4$, Fig. 8, looking from the right chiefly to show the selvage-shuttle and its actuating devices. Fig. 21 is a detail showing part of the loom-frame at its right-hand side, looking from the front of the loom, and part of the stop mechanism and tension devices for the weft-thread going to the weft carrier or needle for inserting the weft double. Fig. 22 is a detail looking from the right-hand side of the loom, chiefly to show the cloth-lifting device and the devices employed for actuating it, together with the devices employed to actuate a selvage-heddle. Fig. 23 is a detail yet further illustrative of the said selvage-heddle and the means for supporting and actuating it. Fig. 24 is a partial left-hand side elevation of the loom, chiefly to show the tuft-yarn cutters and their actuating devices, the said cutters being omitted from all the other figures, except Fig. 22, to avoid confusion in the drawings; but in Fig. 22 the stand at the right-hand side of the loom and part of the arms, duplicates of those shown in Fig. 24, are shown. Fig. 25 is a detail showing part of the stop-motion for the weft-thread. Fig. 26 shows one of the upper or back-shear-operating levers detached. Figs. 27 and 28 show, respectively, the upper and lower cutter-actuating cams. Figs. 29 to 36, inclusive, represent some of the different cams employed for operating the different parts, the said figures showing the shapes of the said cams and the grooves therein; Fig. 37, Sheet 12, an inner side view of the brake-wheel $b^{15}$. Fig. 38 is a detail showing some of the devices for reciprocating the selvage-shuttle carrier. Fig.

39 is a detail showing the catch-block for the handle-rods 140 and 140ˣ, and Figs. 40 and 41 details to be referred to.

The frame-work of the loom, consisting, essentially, of the side frames A A' A², mounted one on the other, (the part A² containing the chief parts of the jacquard,) are and may be of usual or suitable shape, said frame-work being joined by suitable cross beams or ties.

It will be understood that the filling employed in this loom will be carried and inserted double by a needle attached to a horizontally-sliding carriage, and that the tuft-yarns $t$ (shown partially only in Figs. 5, 6, and 7) will come from suitable spools or bobbins mounted in a creel-frame at the rear of the loom, and that the loom will be provided with usual and suitable shed-forming devices to form sheds in the back or foundation warps, which may be composed of cotton, jute, or other strong material, and that the loom will be provided with two or more warp-beams, suitable whip-rolls, and tension and let-off mechanisms, and with means for rotating the roll 42, which will or may be provided with suitable pins to enter the carpet or fabric and take the same up as woven, and these devices are and may be substantially as in the patents referred to, and therefore it has not been considered necessary in this present instance to show any of the said parts or devices, but only to show the different parts herein to be claimed, together with such parts common to the said looms which are changed or modified in construction to actuate the said novel parts.

Referring to the drawings, $B^8$ represents the power-shaft, it having secured thereon part of a friction-clutch pulley $B^9$, which receives the usual driving-belt. $B^{12}$ represents the other part of the friction-clutch pulley, said part being splined upon the said shaft $B^8$ and being adapted to be moved to the right in Fig. 8 to clutch the continuously-rotating part $B^9$, whenever the shaft $B^8$ is to be rotated. The details of these clutch parts are not shown, as they may be of any usual construction common to clutch-pulleys, or as in the Patent No. 245,259 referred to. The part $B^{12}$ has its hub provided with an annular groove, which is entered by projections at the inner end of a forked lever $a$, jointed by a link $a^3$ to an arm attached to the shipper-shaft $a'$, the said shipper-shaft having a shipper-handle $a^2$, (see Figs. 2 and 9ª,) provided with a pawl $a^{20}$, acted upon by a spring $a^{21}$, the said pawl having a projection at its lower end adapted to engage a notch $a^{22}$ in a stand $a^{23}$ when the shipper-handle $a^2$ is in the position shown in Fig. 8, the parts of the friction-clutch pulley at such time being disengaged and the loom at rest. The link $a^3$ is jointed to the arm $a^{24}$ of the rock-shaft $a'$ in such manner that when the handle $a^2$ is thrown over to the left in Fig. 8 or to the right, viewing Fig. 9ª, against the stop $a^{25}$, the center of the joint between the arm $a^{24}$ and the link $a^3$ will fall below the horizontal center of the shaft $a'$, thereby keeping the handle $a^2$ in that position and the clutch parts closed to run the loom. The shaft $a'$ has loose on it between two collars $a^{27}$ (see Fig. 2) the hub of an arm $a^{28}$, which is connected by a link $a^{29}$ to a vertically-movable slide-rod $a^{30}$, (shown also in Fig. 3ᵇ and partially in Fig. 9ᵇ,) the lower end of which is extended loosely through a guide-stand $a^{31}$, secured to the frame-work, the said slide-rod being surrounded above the said stand by a spiral spring $a^{32}$, the lower end of which rests upon the said stand while the upper end of the said spring acts against a collar $a^{33}$, secured to the said rod, the said spring normally acting to push the said slide-rod, as shown by dotted lines, Fig. 9ᵇ, upwardly against the shank of a block $a^{34}$, (shown separately in said figure,) the said shank being adapted to slide horizontally in a stand $a^{35}$, secured to the frame-work. The shank of the block $a^{34}$ has a hole in it, as shown in Fig. 9ᵇ, for the reception of rod $a^{30}$, the dotted lines showing said rod in said hole, and the block has an opening $a^{37}$, through which are extended several legs to be described, constituting parts of the several stop-motions. The block $a^{34}$ is normally pressed inwardly by a spring $a^{38}$, and in such position the upper end of the slide-rod $a^{30}$ acts against the under side of the said block, as shown by full lines, Fig. 9ᵇ, and the spring $a^{32}$ is compressed. Whenever, however, the block $a^{34}$ is pulled outwardly, as will be described, then the hole in the said block comes in line with the said rod $a^{30}$ and the latter is permitted to rise under the action of the spring $a^{32}$ and enter the said hole, and said rod through the link $a^{29}$, connected to the arm $a^{28}$, causes the shoulder $a^{40}$ (see Fig. 3ᵇ) of the said hub to act against the shoulder of the collar $a^{27}$, fast on the shaft $a'$, (see Fig. 9ᶜ,) and turn the same in the direction to disengage the clutch part $B^{12}$ of the clutch-pulley from the part $B^9$ and stop the loom.

Providing the hub of the arm $a^{28}$ and the collar $a^{27}$ with shoulders, as described, and mounting the said arm on the shaft $a'$ loosely enable the shaft $a'$ to be operated by the handle $a^2$ to release or clutch the clutch-pulley parts together, as desired, without moving the slide-bar $a^{30}$.

The loom-frame has a suitable stand at $b^{10}$, in which is mounted a rock-shaft $b^{12}$, (see Fig. 2,) having an arm $b^{13}$, which, twice during each rotation of the power-shaft $B^8$, is acted upon by the cam projections $b^{14}$ (see Fig. 37) of the brake-wheel $b^{15}$, attached to the said power-shaft. A spiral spring $b^{16}$, connected to an arm of the rock-shaft $b^{12}$ and to a suitable stand on the frame-work, normally acts to keep the end of the arm $b^{13}$ in the range of the said cam projections $b^{14}$. The opposite end of this rock-shaft $b^{12}$ has an arm or vibrator $b^{17}$, which vibrates close to the under side of the head of the block $a^{34}$, so that whenever the end of either of three legs to be described is permitted to descend below the head of the said block, the said vibrator will strike it and pull the block $a^{34}$ outwardly against the spring $a^{38}$, permitting the hole in the shank of the said block to come in line with the rod $a^{30}$ to enable the latter to rise and the shaft $a'$ to rock to stop the loom, as described.

The leg $b^{18}$ (shown in Fig. 2 and partially in Fig. 9) forms part of what is called the "shuttle stop-motion." This leg has its upper end turned down to enter the opening $a^{37}$ of block $a^{34}$ at its end nearest the front of the loom, and when the said leg is in its normal position and the thread in the selvage-shuttle is being properly delivered the said downturned end of leg $b^{18}$ stands above the bottom of the block $a^{34}$. The lower end of the rod $b^{18}$ is jointed to an arm $b^{21}$ of a rock-shaft $b^{22}$, extended across the loom-frame and provided at its opposite end (see Fig. 20) with an arm $b^{23}$, which has attached to it a link $b^{24}$, which in turn is jointed to the lower end of the selvage-shuttle-thread controller $b^{25}$, pivoted at $b^{26}$ on a suitable stand $b^{27}$, the upper end of the said controller $b^{25}$ being vibrated in the direction of the warps between the selvage of the cloth at that side of the loom and the inner side wall of the selvage-shuttle race $b^{28}$, which is bolted to a suitable fixed part of the loom. The shuttle-race is arranged in the arc of a circle and containing the selvage-shuttle $b^{29}$, which is actuated by a shuttle-carrier $b^{30}$, having usual horns, such as commonly employed on carriers for moving sewing-machine shuttles, the said carrier by its horns passing the shuttle $b^{29}$ through the loop of weft-thread carried through the shed double. The shuttle-carrier (see dotted lines, Fig. 20, and detail, Fig. 38) is connected by a link $b^{69}$ to an arm $b^{70}$ of an elbow-lever pivoted at $b^{31}$ on a suitable stand, the opposite end of the said elbow-lever being connected by a link $b^{32}$ to the upper end of an elbow-lever $b^{33}$, which is acted upon by a suitable cam $b^{34}$, fast on the cam-shaft $B^2$ near the left-hand side of the loom. A spring $b^{35}$, connected to the said lever $b^{33}$ and to a hook $b^{36}$, normally acts to keep a roll or projection of the said lever against said cam.

Figure 34:
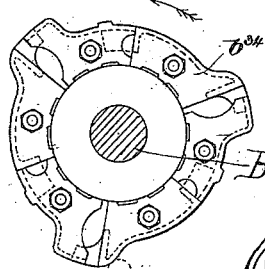
Figure 35:
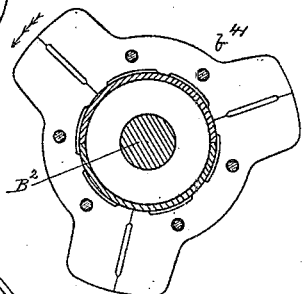
Figure 36:
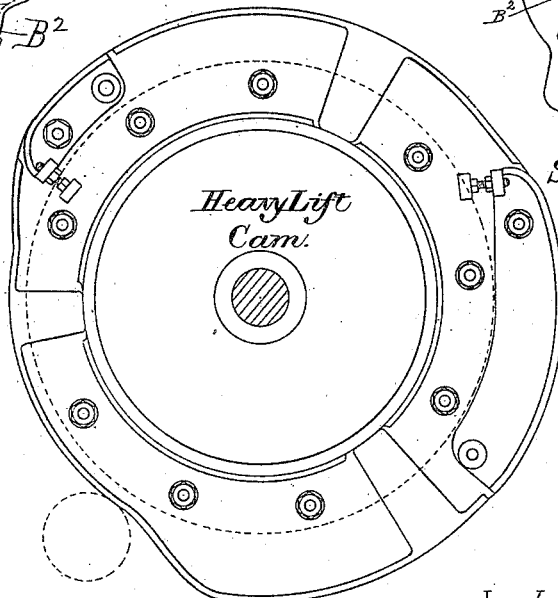

The rock-shaft $b^{22}$ referred to, near the right-hand side of the loom, has connected to it an arm $b^{37}$, (shown chiefly by dotted lines, Fig. 2,) to which is jointed a rod $b^{38}$, (see Fig. 1,) connected to one end of a lever $b^{39}$, pivoted upon a stand $b^{40}$, the opposite end of the said lever having a roller or other stud, which is acted upon by a cam $b^{41}$, fast on the cam-shaft $B^2$, just within the frame-work, near the right-hand side of the loom, the cams $b^{34}$ and $b^{41}$ being shown separately in Figs. 34 and 35, the said cams having three points, so as to move the parts actuated by them once for every pick of filling inserted double into the fabric.

The spring $b^{75}$, connected to the lever $b^{39}$, causes the upper end of the said thread-controller to move toward the rear of the loom and act upon the selvage-shuttle thread to take up any slack therein, and in case the said shuttle-thread breaks the shuttle-thread controller continues its movement sufficiently far under the action of the said spring to further turn the rock-shaft $b^{22}$ in the direction to cause the downturned end of the leg $b^{18}$ to descend below the block $a^{34}$, so that the vibrator $b^{17}$ catches it and effects the stopping of the loom. The shape of the cam $b^{41}$, which acts on the lever $b^{39}$, is such that it acts intermittingly to throw the thread-controller $b^{25}$ toward the front of the loom, the spring $b^{75}$ normally acting to move the said controller toward the rear of the loom to act on and take up the slack in the shuttle-thread. The movement of the controller $b^{25}$ due to spring $b^{75}$ is stopped by the thread as soon as the slack is taken up, and the thread then acts to prevent the spring $b^{75}$ from moving the lever $b^{39}$ far enough to enable the roller at the inner end of said lever to enter the bottom of a space between the throws of the cam $b^{41}$, (see Fig. 35;) but in case the thread breaks the spring $b^{75}$ has full control of the controller and moves the same sufficiently to draw down the leg $b^{18}$ and effect the stopping of the loom, as described, the roll at the end of the lever $b^{39}$ then bottoming in the lowest part of the cam $b^{41}$. The selvage-shuttle-thread controller $b^{25}$, also, by its action upon the shuttle-thread, keeps the said thread so taut that the loop or filling through which it is passed when the said loop is being drawn back and properly tightened in the fabric does not draw the selvage-shuttle thread within the regular selvage-threads of the warp.

The loom-frame has applied to it a suitable stand $c^{10}$, (see Fig. 25,) having a spring $c^{12}$, which bears upon the filling-thread $f^t$, it coming from a suitable can or bobbin (not shown) and going to the usual filling-thread carrier or needle. (Not shown.) The filling-thread just beyond the spring referred to receives upon it a hook or eye $c^{13}$ of a rod pivoted at $c^{14}$ and having a leg $c^{15}$, which is also extended down through the hole $a^{37}$ in the block $a^{34}$, and in case the filling-thread breaks the said leg is permitted to drop sufficiently below the said block to be caught by the vibrator $b^{17}$, so as to pull out the said block $a^{34}$ to stop the loom, as before described. The third stop-motion, which is made effective through the vibrator $b^{17}$ described, acts when two tuft-yarn carriers are dropped at the same time between the open eveners. This third stop-motion contains the leg $c^{16}$, which is extended upwardly through a guide in a stand $c^{17}$, attached to the loom side, the said leg having a lug or projection $c^{18}$ (see Fig. 9) at its inner side, which is below the said guide, the said projection resting upon an arm $c^{19}$, (see Fig. 3,) attached to a rock-shaft $c^{20}$, having bearings in the said stand, the said rock-shaft having a second arm $c^{21}$, (see Fig. 5,) which is adapted to be acted upon by an arm $c^{22}$, connected to a rock-shaft $c^{23}$, having its bearings in the side rods 120, the said rock-shaft $c^{23}$ having a like arm near each side of the loom. The rock-shaft $c^{20}$ has an arm $c^{24}$, acted upon by a spring $c^{25}$ to normally cause the arm $c^{19}$ to keep the leg $e^{16}$ elevated, so that its lower end does not protrude below the bottom of the block $a^{34}$. The eveners 146 and $146^\times$ to be described, which act on the lower ends of and align the dropped or selected tuft-yarn carriers $c$, are connected to the lower ends of arms 25 and $25^\times$, pivoted on studs 145 and $145^\times$, carried by the rods 18 of the swing or lift frame to be described. The arms 25 have each an upward extension 153, which, in case two tuft-yarn carriers or needles $c$ should happen to be dropped at the same time in any one carriage, so as to prevent the evener 146 from remaining in its normal acting position, by the action of the spring 147 will cause the said extensions 153 to act upon the described arms $c^{22}$ and push them out or back in the direction of the arrow near one of said arms in Fig. 5, so that when the swing-frame which raises and lowers the tuft-yarn carriers descends to cause the lower ends of the selected needles $c$ to be entered between the warps the said arms $c^{22}$ will strike the arm $c^{21}$ of the rock-shaft $c^{20}$ and turn it far enough to permit the leg $c^{16}$ to drop with its lower end below the block $a^{34}$, to be struck by the vibrator to stop the loom, as before described.

The evener $146^\times$ has to move many carriages and needles, and the strain on it is at times considerable, and if the rock-shaft $c^{23}$ should have an arm $c^{22}$ at but one end, so that the shaft $c^{23}$ could be turned only at one end, the springing of the evener might render the third stop-motion uncertain. So to do away with this uncertainty the shaft $c^{23}$ has two arms $c^{22}$, one near each end.

The shaft $a'$ has an arm $d^{14}$, (see Fig. 2,) which is connected by a link $d^{15}$ with one end of the brake-lever $d^{16}$ pivoted at $d^{17}$, the said brake-lever having a suitable brake $d^{18}$, which when the shaft $a'$ is turned to release the clutch-pulley also causes the said brake to be forced against the periphery of the brake-pulley $b^{15}$.

The top board E, (shown in Figs. 3, 4, 10, 14, and 18,) provided with a series of longitudinal griff-bars 100, has at its opposite ends ears 117, which are suitably bolted to carriages E', suitably shaped to slide in the end slots 118 of the Jacquard frame-work $A^2$. These carriages have studs 101, which receive upon them metal loops 119, (see Fig. 10,) into which are screwed the upper ends of rods $E^2$, the lower ends of which rods are screwed into joint blocks 120, (see Figs. 5 and 9 and dotted lines in Fig. 3,) the said joint blocks being pivoted between the bifurcated ends of radius-bars 121, pivoted at 122 on the loom side, said radius-bars acting chiefly as guides to control the lower ends of the joint blocks in their vertical movement. The ear at the lower end of each joint block, there being one at each side the loom, has pivoted to it at $e^{17}$ the upper end of one of the like side bars 18 of the tuft-yarn-carrying swing or lifting frame, the lower ends of the said arms being jointed at 14 to the upper ends of the arms $e^3$, common to United States Patent No. 245,259, the said arms being adapted to slide vertically in grooves at the inner sides of the arms $e^8$, pivoted at $e^{62}$ in stands $e^{18}$, attached to the frame-work. These arms $e^8$ and the slides $e^3$ are substantially the same as in the said patent, and are actuated by substantially like means, under, however, slight modification. In this instance the arms $e^8$ derive their backward or forward movement once during the insertion of each three double picks of filling by or through a tubular rock-shaft $e^{13}$, surrounding the shaft $f$, the said rock-shaft near each end having like arms $e^{12}$, which have attached to them at their upper ends rods $e^{10}$, which are connected to the upper ends of the arms $e^8$, the said rock-shaft having an arm $e^{14}$, provided with a roller or other stud which is acted upon by the cam $e^{15}$ on the main cam-shaft $B^2$ of the machine.

The slide-bars $e^3$ have attached to them at their lower ends links $f^2$, which are jointed to arms 125, pivoted at 126 upon arms $f^3$, attached to the rock-shaft $f$, the said arms having slots, as shown in Fig. 1, to receive bolts $126^\times$, attached to the arms 125 to thereby permit the said arms to be adjusted on the arms $f^3$ and enable the exact positions of the top board and all parts which move in unison with it to be determined as to their highest and lowest positions.

The rock-shaft $f$ has an arm $f^4$, which is acted upon by a cam $f^5$, there being one such arm near each end of the rock-shaft and one such cam near each side frame of the loom, so as to lift the arms $e^3$ and the parts above it equally at both sides, the said cams being denominated the "heavy-lift cams." The rods $E^2$, referred to as forming part of the said swinging and lifting frame, have secured to them by set-screws 114 the hubs 113, to which is suitably bolted the needle-guide board $E^4$, the said guide-board having (see Fig. 18) a series of parallel bars 134 and a series of transverse wires 115, so located with relation to each other as to receive the broadened loop-like ends of the hooks G to be described, and prevent the said hooks from twisting or partially rotating and so hold them that their upper ends 135 will always be properly caught at the proper times on the griffs 100.

The top board E has suspended from it by links 102 (being best shown in Figs. 10 and 14) a hook-locking board $E^3$, the said links being bolted by bolts 103 to ears 104 of said frame. This frame has a series of longitudinal bars 110 and a series of transverse bars 112, (see Fig. 15,) thus making spaces for the reception of each hook G. One of the links 102 is connected by the link 105 to a short arm 106 (shown by full lines Fig. 10 and dotted lines Fig. 14) of a rock-shaft 107, extended across the loom-frame, the said rock-shaft having an arm 106×, to which is jointed a hand-rod 108, extended down within the reach of the operator to the right-hand side of the loom, so that the operator by pulling down upon the said rod may move the locking-frame E³ from its position, Fig. 18, in the direction of the arrow in said figure, such movement taking place, however, at a time when all the needles c are lifted by the hook-lifting board F, at which time the upper ends 135 of the hooks are above and clear of the griffs 100. The movement of the hook-locking board in the direction stated causes the bars 110, carried thereby, to act against the hooks G and press them aside in such position that when the top board is again lifted the griffs engage and lift all the hooks acted upon by the bars 110, and while the locking-frame remains in such position the top board is raised and lowered, taking with it all needles or carriers connected to the hooks which are kept on the griffs, but said needles or carriers are not lowered far enough to enter their yarns into the shed and form tufts. While the tuft-yarn carriers or needles are so raised and lowered, but do not make tufts, the usual harness-frames (not shown, but common to United States Patent No. 245,259 and to usual tapestry-carpet looms) shed the jute or backing warp, and together with the filling inserted double a heading or untufted portion is woven. During this operation, the hooks held by the griffs cause the Jacquard needles to be thrown in and out of the range of the cards of the Jacquard needles, so that the said needles are not reciprocated.

We have omitted from the locking-frame bars 110 to act on the first and last row of hooks, for at times it is desired to weave a border with one or more rows of needles lifted as a bank by the lower hook-board F. To enable this to be done when desired with, say, the row of needles nearest the breast-beam, the stands 136, supporting the rock-shaft 107, receive a rock-shaft 137, having two or more arms 138, (see Fig. 14,) to which is attached a bar 110×. The shaft 137 has an arm 139, to which is jointed a hand-rod 140, extended down near the left-hand side of the swing-frame 18, the said rod having a suitable collar 410 to rest either above or below a catch-stand 412 attached to the swing-frame below the joints of the levers 25 25×. By pulling down on this hand-rod after disengaging it from the catch-stand, the bar 110× controlled by it may be placed in condition to act on the first row of hooks and throw them into position to be engaged by the griff next to them, while the bars 110 of the locking-frame act to keep the other rows of hooks on the griffs, and then a heading will be woven. In case, however, that a border is to be woven, then the hand-rod 140 will be disengaged from the catch-standard and pushed up, so that the bar 110×, carried by the arms 138 of the rock-shaft 137, will not strike against the row of hooks next to it when the locking-frame is moved aside, as described, and the first row of hooks will remain with their shouldered lower ends on the lower lifting-board F to be raised as a bank, the first row of needles or carriers inserting the tuft-yarns carried by them into the sheds and forming rows of tufts. In like manner the bar 110×× for the rearmost row of hooks has been attached to arms 138× of a rock-shaft 137× in brackets 136×, the said shaft having an arm 139× and an attached hand-rod 140×, provided with a suitable collar 410×, to co operate with the opposite end of the catch-stand 412 to that which is engaged by the hand-rod 140. By moving the rock-shaft 137× in one direction its bar 110×× will cause the hooks next to it to be all caught by the griffs with which they co-operate, and in the other direction the said hooks will be permitted to fall with their shouldered ends on the lower lifting-board F to be worked in bank. The hand-rod 108 of the rock-shaft for moving the locking-board will have a catch-stand 450. (See Fig. 40.) Fig. 41 shows parts of the rods 140 and 140× and the catch-stand.

The arms 18 of the swing-frame referred to have bolted to them suitable stands 141, which support the outer ends of the nib-board H, the said nib-board (see Fig. 6) having a series of longitudinal rods 141×, and a series of transverse bars 142 to thus divide the interior of the said nib-board into small spaces, one for each tuft-yarn-carrying needle c, the said needles each having near its upper end above the said board a nib 143, which nib, when any needle has been selected so that it is dropped in order that a tuft may be made from its yarn, will strike against one of the transverse cross-bars 142, said bars thus serving to support the weight of the needles. Erected upon the ends of the nib-board (see Fig. 9) are like stands 144, to the upper ends of which are suitably secured the lower guide-board H' for the tail-cords G⁴, the joint e¹⁷ before referred to, about which the upper ends of the arms 18 of the swinging and lifting frame turn, being located substantially or nearly in line with the said lower guide-board, instead of at a considerable distance below the said guide-board, as in the Patent No. 343,110 referred to, for it has been found that by elevating the said described pivotal point e¹⁷, as described, wear upon and consequently cutting of the tail-cords into the lower guide-board is substantially done away with, and as such wear is a very serious detriment in the operation of the Jacquard mechanism this elevation of the said pivotal point becomes an element of importance.

The arms 18 each have two like studs 145 and 145×, upon which are pivoted the evener-carrying levers 25 25×, provided at their lower ends, respectively, with like eveners 146 and 146×, the said eveners instead of being simply round rods, as in the Patent No. 343,110 referred to, being made as broad flat plates to stand underneath all those needles which are not selected and dropped, so that, in case any tail-cords should break and a needle not wanted should drop, it will rest upon the evener below it.

The evener-lever 25 has connected to it a spring 147, the opposite end of which spring is connected in a suitable manner to a stand $147^\times$, attached to the other evener-lever $25^\times$, (see Fig. 5,) the said spring normally keeping the lever 25 pressed against a suitable stop $t^2$, (see Fig. $5^a$,) forming part of the stands $p$, bolted at $p'$ to the arms 18, the said stands having wings 151. The inner edge of the evener 146, carried by the levers 25, always stands normally in one position; but the said levers 25 may be moved toward the front of the loom by or through the action of the evener $146^\times$, carried by the arm $25^\times$, acting against the dropped needles, and so also when it is desired to gain access to the needles and carriages to be described the arms 25 may be engaged by hand and turned outwardly toward the front of the loom, where they may be retained by reason of pawls or dogs 149, (see Figs. 5 and $5^a$,) pivoted upon the said arm 25, which dogs engage projections 150 of the said wings 151, connected to the said stands $p$. The ends of the wings 151 have lugs 405, (see Fig. $5^a$,) which receive screws 406, (see Fig. 5,) which screws fasten to the said wings a cap-plate $151^\times$. (See Figs. 5 and 9.)

The levers $25^\times$ have jointed to them connecting-rods $25^a$, in turn jointed to the upper ends of levers $25^b$, adjustably connected by bolts $25^c$ to a web $25^d$ of a tubular shaft $25^e$, surrounding loosely the lay-actuating shaft $h^{20}$, the said tubular shaft having an arm $25^f$, provided at its lower end with a roller or other stud, which enters a cam-groove $25^g$ (see Fig. 29) at one side of the evener-actuating cam $25^h$, fast on the cam-shaft $B^2$.

The stands $p$ have at their lower ends horizontal extensions $t^3$, and to the ends of these extensions are bolted the opposite ends of cross-bars $t^4$, provided with a series of notches in which are laid a series of tracks $H^4$, composed of thin steel plates. One of these tracks is shown in section in Fig. $7^c$. Each of the said tracks serves to receive upon it and support one of the carriages $H^5$, each of which has a projection $t^5$ near its upper end to rest upon one of the said tracks, the carriages, equal in number to the tufts in each transverse row of tufts, being adapted to slide upon the said tracks, as will be described, when the eveners act upon the selected or dropped needles $c$ to align them. The carriages are also adapted to be moved backwardly away from the breast-beam after each tuft-pick by the action against the other end of the carriages of the carriage-evener bar $H^6$, (see Fig. 9,) connected at its ends to arms $H^7$, jointed to the lower ends of the evener-levers $25^\times$. Each carriage has a series of pockets (see Figs. $7^a$ and $7^b$) to receive the lower ends of the needles $c$, the said carriages each having a series of pockets corresponding to the number of longitudinal rows of needles employed—as, for instance, in practice there may be from six to ten needles standing one in front of the other in the direction of the length of the arms $t^3$, and there will be as many needles in each transverse row of needles as there are tufts to be inserted in each transverse row of tufts. The carriages slide freely on the tracks referred to, and the eveners act upon the lower ends of those of the tuft-yarn carriers $c$, which are selected for the next row of tufts to be made to align them across the warp, the said carriers at such time being dropped below the said carriages by the descent of the lower lifting-board F, upon which rest the lower ends of the hooks G, connected with the said carriers $c$ so to be used.

Mounting the carriages upon the tracks so as to slide thereon instead of providing the carriages with extensions to slide in grooves, as has been done, adds to the compactness of the parts of the loom.

It will be understood that the tuft-yarns $t$, taken from suitable spools or bobbins directly to the eyes of the needles, are led down through the said needles and out from their lower ends, each needle being provided, as best shown in Fig. 7, with one or more holding or retaining devices, said devices being herein represented as points 152, so arranged and directed as to enter the tuft-yarn $t$ and prevent it being drawn backward into the needle; but we do not intend to limit our invention to the exact form of holding devices shown. The needles are also provided with openings at their edges near their delivery ends (see Fig. 7) to enable the tuft-yarns to be easily threaded into the needles.

It will be understood that the top board, the controlling-board, the hook-guiding board, the nib-board, the lower guide-board $H'$, and the carriages, their tracks and supporting devices, all rise and fall in unison, they deriving their vertical movement from the heavy-lift cam referred to.

The arms $25^\times$ have jointed to them at their lower ends arms $H^7$, connected to a carriage evener bar or rod $H^6$, which crosses the loom in front of all the carriages, so that when the arm $25^\times$ is moved toward the rear end of the loom, the said bar by acting upon all the carriages will push them back into their normal position upon the tracks, and in this position of the carriages the tuft-yarn carriers will be selected, as will be described, and those carriers which are to be used in the next row of tufts will be permitted to descend below the carriages, the arms 25 at this time being arrested by their stops $t^2$, and thereafter the evener $146^\times$, attached to the arm $25^\times$, will be moved toward the selected tuft-yarn carriers or needles $c$ and will carry them all forward against the evener 146, which is held in position by the spring 147; but in case two needles $c$ in one carriage have been dropped between the eveners, the evener 146 will receive an extra motion and cause the extension 153 to stop the loom, as described.

The arms H have attached to them at the opposite sides of the loom springs 410, the opposite ends of which are attached to pins or projections of the stand $p$, attached to the swing-frame 18, and the said arms have projections which when they are fully lifted by the springs act against stops 422 carried by the levers $25^\times$. These springs normally hold the bar $H^6$ up so as to act against the ends of the carriages; but in case it is desired to remove a carriage or draw it out more or less to gain access to the tuft-yarn carriers therein, then the levers 25 are pulled out by hand from the front of the machine, and the arms $H^7$ are depressed sufficiently to place the bar $H^6$ below the lower ends of the carriages, so that the latter may be pulled out.

The rods $E^2$ are screw-threaded for some distance near their lower ends and receive upon them adjustable lifting-nuts 154. (See Fig. 10.)

Interposed between the hook-guiding board $E^4$ and the lower tail-cord-guiding board $H'$ is a hook-lifting board F, having depending from it the upper guide-board $F^2$ (see Fig 10) for the tail-cords $G^4$, so that the said hook-lifting board and upper guide-board move together in unison. These two boards have, however, a motion at times in unison with the rising and falling rods $E^2$, and at times a motion independent thereof. The hook-lifting board has suitable end pieces which are bolted by bolts 155 to carriages $F^3$, fitted to slide vertically in the slots 118 in the Jacquard frame $A^2$, below the carriages $E'$. These carriages $F^3$ at opposite sides of the loom have at their outer sides suitable studs, as $F^4$, which receive short links $F^5$, which are jointed to levers $F^6$, pivoted on the frame at $F^7$, the opposite ends of the said levers (shown as broken off in Fig. 3 to save space upon the drawings) having attached to them rods $F^8$, the lower ends of which are jointed at $F^9$ to a hand-lever $F^{10}$, pivoted at its lower end to a lever 43, in turn pivoted at 44, and having a suitable roller or other stud, as $F^{10\times}$, which is acted upon during the rotation of the main shaft by the periphery of a cam $F^{12}$, (see Fig. 32,) bolted or otherwise secured to the inner side of the large gear-wheel $C^2$, fast on the main cam-shaft. By turning the lever $F^{10}$ outwardly from its position Fig. 1, the rod $F^8$ will be drawn down and turn the lever $F^6$ in the direction to raise the lower hook-board F. The catch 408, attached to the lever $F^{10}$, is made as a spring to engage frictionally one side of the rod $F^8$, to thus hold the lever $F^{10}$ in the position shown in the drawings.

To those conversant with Jacquard mechanism it will be understood that all the hooks G must be lifted so that their upper hooked ends 135 will be entirely free from the griffs 100 of the top board prior to bringing the Jacquard cards forward to act upon the Jacquard needles to select those hooks which are not to be kept up, and at such time all the hooks must be free to be moved easily. The hook-lifting board F accomplishes this, and when the moving part, of which the top board E is the crown, has been elevated into its uppermost position, then the cam $F^{12}$ referred to acts to raise the hook-lifting board, which temporarily lifts the upper hooked ends of the said hooks above the griffs, and the Jacquard needles, having been operated to make the next selection to constitute the next row of tufts to be made, the said hook-lifting board is permitted to drop until its ends meet the adjustable rests 154 on the rods $E^2$, after which the top board and its attached parts descend; but the said descent does not take place until the proper shed is open for the reception of the tufts. The hand-lever referred to is to enable the operator to raise and lower the hook-lifting board by hand, which is a matter of very considerable convenience when it is desired to overcome any disarrangement of the needles.

The Jacquard cylinder is of usual construction, as are the devices for actuating it, so it is only necessary to state that the said cylinder derives its horizontal motion from like links J at each end, which connect with arms $J'$ of a rock-shaft $J^2$, having a third arm $J^4$, which by a connecting-rod $J^5$ is jointed to a radius-bar $J^6$, pivoted loosely upon a stud $J^7$ of a stand secured to the loom side. This same stud has also mounted loosely upon it a radius-bar $J^8$, to which is jointed a connecting-rod $J^9$, attached at its lower end to the end of a lever 64, having its fulcrum at $J^{10}$, the said lever having a roller or other stud $J^{10\times}$, which enters a cam-groove $J^{12}$ in the cam $F^{12}$, secured to the inner side of the large toothed wheel $C^2$ referred to. Ordinarily the two connecting-rods referred to are in one piece, but in this invention the two radius-bars have been interposed. These radius-bars each have a hole through them from side to side, (see Figs. $9^c$ and $9^d$,) the said holes being in line, and the radius-bar $J^6$ first referred to has an ear which receives a vertical pin $J^{13}$, upon which is mounted a hand-lever $J^{14}$, having a lug $J^{15}$, which may be made to enter both holes in the said radius-bars and lock them together, so that they will move in unison; but when for any reason it is desired to rotate the pattern-cylinder or actuate it backward or forward the said hand-lever may be moved to withdraw the said projection from the hole in the radius-bar $J^8$, and thereafter the operator by a reciprocation of the said hand-lever may actuate the Jacquard pattern surface, this being of very considerable importance, as it enables the cylinder to to be adjusted to correct any faults in picks or weaving. The lowering of the hook-supporting board F to move the upper ends of the hooks G connected to the needles next to be used away from the griffs 100 of the top board takes place immediately after the action of the Jacquard boards upon the needles, and the lowering of the hook-board permits only the hooks which are supported by it to have their connected tuft-yarn carriers or needles descend with their lower ends below the pocketed carriages H⁵, and at this time the evener-levers 25ˣ are moved into their farthest position toward the rear of the loom, and the carriage-evener H⁶ acts upon the front ends of all the carriages and moves them to the rear ends of the tracks. The needles having been dropped below the carriages, the evener-lever 25ˣ now starts forward and the evener 146ˣ acts against the dropped tuft-yarn carriers or needles, carrying them all forward against the evener 146; but, as stated, when two tuft-yarn carriers or needles in any one carriage have been dropped by accident, then the action of one of the said needles $c$ against the evener 146 carried by the lever 25 will throw the extension 153 of the evener into position to operate the leg $c^{16}$ referred to and effect the stopping of the loom. When the eveners are closed together and the dropped needles $c$ are in one straight line across the warps, the said eveners stand underneath all the elevated tuft-yarn carriers or needles, so that in case any should drop from any accident they will be caught upon the said eveners.

Each portion A' of the loom-frame has a suitable stand K, upon which is pivoted at K' an arm K² made adjustable on the said stand by means of an adjusting-screw K³ to rest upon an ear K⁴, a bolt K⁵, extended through the said arm and through a slot in the stand serving to confine the arm in adjusted position. These arms, one at each side of the loom, (see Figs. 24 and 22,) at their free ends receive stud-bolts K⁶, upon which are mounted to turn the arms K⁷ K⁸, to the lower ends of which are attached, respectively, the shear-blades K⁹ K¹⁰. The arms K⁸ have jointed to them links K¹² attached to arms K¹³ of a tubular shaft K¹⁴, Fig. 26, having an arm K¹⁵, provided with a roller or other stud, which enters a cam-groove at one side of a cam K¹⁶. (Shown separately in Fig. 27 and fast on the cam-shaft B².) The arms K⁷ have jointed to them connecting-rods K¹⁷, attached to arms K¹⁸, secured to the shaft K¹⁹. The shaft K¹⁹ has an arm K²⁰, connected by link K²¹ to a lever K²², pivoted at K²³, and having a roller or other stud acted upon by the cam K²⁴. (Shown separately in Fig. 28.) The arms K⁷ carry the front one of the two blades, and each arm is composed of two parts, one of which slides longitudinally on the other, the said two parts being adjustably connected by the ends of a right and left hand threaded screw 160, the rotation of which enables the arms K⁷ to be lengthened or shortened as desired, the arms being confined in adjusted position by suitable bolts 161, extended through both of them, one of the arms being slotted where the said bolt extends through it.

The under side of the fabric at the time the tuft-yarn is being cut is supported by the fabric-lifting bar or device $r^2$, (see Figs. 3ª, 22, and 24,) which, as will be described, may be actuated so as to lift the back of the fabric always into exactly the same level or horizontal plane when the tuft-yarns are to be cut off.

The vertical adjustment of the cutter-blade K⁹ by lengthening or shortening the arms K⁷, as described, enables the edge of that blade to be always kept in exactly the proper position with relation to the cutting-edge of the shear-blade K¹⁰, notwithstanding wear due to grinding or otherwise.

In this invention it is possible to exactly insure the like lengths of each row of tufts, and it is possible to make the tufts of any desired length according to the stock being used, for the cloth-lifting bar may be adjusted as desired.

The cloth-lifting bar $r^2$ has ears at its lower side near each end, which ears are jointed to arms $r^4$ of a rock-shaft $r^5$ by a rod $r^3$. The rock-shaft $r^5$ has an arm $r^6$ joined by an adjustable connecting-rod $r^7$ to one end of an elbow-lever $r^8$, pivoted at $r^9$ upon a suitable stand mounted on a girt or otherwise. This elbow-lever $r^8$ has a roller or other stud, (see Fig. 22,) which is acted upon by a cam $r^{10}$ fast upon the cam-shaft B². (Shown separately in Fig. 19 and dotted in Fig. 22.) The bearing for the shaft $r^5$ has a fixed ear $r^{12}$, against which strikes a toe $r^{13}$, forming part of the cloth-lifting bar, the said toe and ear preventing the cloth-lifting bar from being tipped too far toward the reed $r$.

In the Patent No. 343,110 the front cutter-blade remained stationary nearly above the row of tufts being inserted, so that it was difficult to see or get at the fabric at that point, but herein the front cutter-blade is made movable, so that it is swung out a considerable distance beyond the cloth-making point while the tufts are being inserted and secured in place, and is held there until the needles $c$ are all lifted preparatory to cutting off the tufts, at which time the front cutter-blade is moved forward nearly against the tuft-yarns and comes to rest, and thereafter the back cutter-blade is moved forward to cut off the yarns, and then both bars are opened or separated, as before.

The hooks G, made of wire, are shaped as best shown in Fig. 18—that is, the lower ends of the wires are turned back upon themselves parallel for a short distance to form an eye s', into which the tail-cords G⁴ are tied, and then the wire is so bent as to form two parallel portions at some little distance apart, leaving a shoulder 163, which, when the needles rest upon the hook-lifting board F, enter pits 164 in the longitudinal bars 165 of the said needle-lifting board, as at the right in Fig. 18, where it will be noticed that the tail-cord-supporting eye of these hooks is at one side of the shoulder referred to, so that the weight of the needles c tied to the tail-cords normally acts to press the hooked upper ends 135 of the needles away from the griffs 100 and against one of the longitudinal bars 110 of the controlling-frame $E^3$, as at the right in Fig. 18. This action greatly assists the usual springs on the Jacquard needles, and enables the said springs to be made lighter or smaller, and, if desired, the said springs might be altogether omitted, but they have been herein retained for additional safety. This provision of a shoulder near one edge of the needle and an eye near its other edge and close together, as represented, and placing the parts $s^2$ of the needle parallel to the main body of the wires above the shoulders enables the length of the needles to be shortened below the shoulder, and it is obvious that the tendency of the weight of the tail-cord and the needle $c$ attached to it will be to turn the said needle about the said shoulder and away from the griff-bars 100, when the hooks 135 turn as in Fig. 18, or by turning them in the direction shown in Fig. $13^a$, the weight of the tail-cords will normally place the hooks 135 in position to be engaged by the said griffs.

The needles herein shown have their broadened parts $s^2$ enter the needle-guide board $E^4$ above their shoulders 163, which is also a feature of invention, and it will be obvious that the closer the shoulder is to the eye in which the tail-cord is tied the greater the swinging motion which the weight of the tail-cord and needle $c$ will give to the hook.

In weaving tufted carpets in a loom of the class described wherein the weft or filling is inserted double and caught at the opposite side of the shed by a thread carried by a small shuttle, it has been found that when the shed is closed, after the weft has been drawn back, the tension of said weft on the selvage-warp of the lower shed near that selvage prevents it from rising sufficiently to properly close the shed at that selvage, and so keeps the tufts at that point down below the adjacent tufts. We ascertained by experiment that this difficulty could be overcome by putting greater strain on the said selvage-warp, and to do this we have added to the loom what we denominate a "selvage-thread lifter," which we will now describe. The usual harness-frames (not shown, because common in the patents referred to) run at their ends in guides $w^2$, supported upon suitable stands $w^3$. (See Figs. 22 and 23.) Upon one of these guides we have arranged loops $w^6$, in which slides a heddle-carrier $w^4$, having a heddle $w^5$, which receives one of the selvage-warps. This heddle-carrier is connected at its lower end by a link $w^7$ to a lever $w^8$, having a roller or other stud at its end, which is acted upon by a cam $w^9$, fast on the cam-shaft $B^2$, the said cam being shown separately in Fig. 31.

Figure 33:
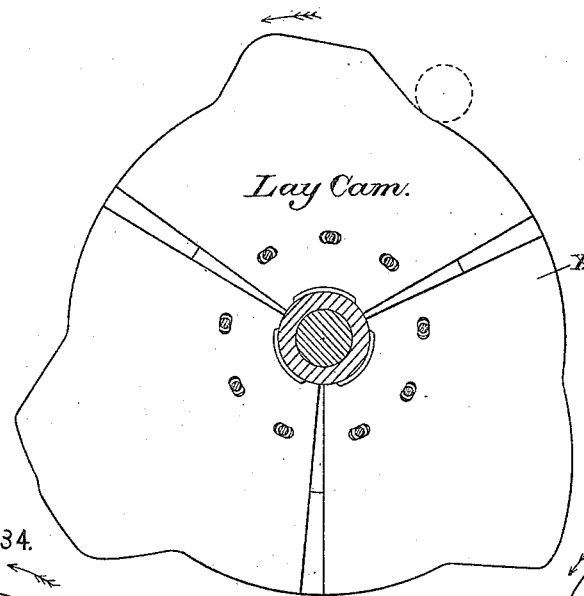

In Fig. 33 we have shown separately the lay-operating cam X, it being shaped, as represented, to impart to the usual lay $d^2$ its forward and backward movement, the said cam acting upon a roller at the end of the arm $h^5$, connected to a rock-shaft $H^{20}$, having an upright arm 409, which is jointed by the connecting-rod $h^2$ to the lay, there being like arms and rods at each side of the lever, all substantially as in one of the patents referred to.

We have shown one form of stop-motion mechanism under control of the extension 153 to release the shaft $a$ and stop the loom whenever two carriers or needles $c$ in one carriage drop between the separated eveners; also, one form of stop-motion mechanism between the shuttle-thread controller and the said shaft to stop the loom when the selvage-shuttle thread breaks; but we do not desire or intend to limit this invention to the exact form of the devices and number of pieces shown and described, as it will be obvious that the shape and construction of these parts might be variously modified without departing from our invention, we being the first to provide a loom of this class with stop-motion devices for the purposes stated, so far as we are aware.

In the Patent No. 343,110 the point of the needle was made hollow; but the tuft-yarn was for quite a distance led along the outside of the needle in the direction of its length.

In practice it has been found that the tuft-yarns become entangled with each other on their way to the delivery-eyes of the needles, and to obviate this we have made the needles hollow or tubular from at or near their yarn-receiving eyes 400 (see Fig. 6) to their lower ends.

We claim—

1. The tuft-yarn carriers or needles having nibs combined with the nib-board having a series of bars or rods to support the said carriers or needles which are to be used in the production of the row of tufts then to be made, substantially as described.

2. The tuft-yarn carriers or needles and the pocketed carriages having projections $t^5$, combined with tracks parallel to the length of the carriages, and upon which the said projections rest in the sliding movement of the carriages, substantially as described.

3. The lifting-frame, its attached stands having notched bars $t^4$, and the thin track-plates $H^4$, set into the notches and engaging the said bars, combined with the pocketed carriages having projections to rest and slide on the said track-plates between the said bars, substantially as described.

4. The arms 25 $25^x$, arranged in pairs, and the broad evener-plates 146 $146^x$ connecting them, combined with the bars $t^4$, their supports, tracks, pocketed carriages thereon, and tuft-yarn carriers or needles therein, the said eveners being wide enough to extend under the pockets of the carriages and stand below the tuft-yarn carriers or needles, which are not to be used in the row of tufts then to be made, substantially as described.

5. The arms 25 and the evener 146 connecting them, frames $p$, having stops $t^2$, a spring normally to draw the said arms toward the said stops, the arms $25^×$, the evener $146^×$ connecting them, and means to swing the arms $25^×$ positively, combined with pocketed carriages and supports therefor, and the carriage-evener connected with the arms $25^×$, to operate substantially as described.

6. The arms 25 and the evener 146 connecting them, frames $p$, having stops $t^2$, a spring normally to draw the said arms toward the said stops, the arms $25^×$, the evener $146^×$ connecting them, and means to swing the arms $25^×$ positively, combined with the tracks, their supports, pocketed carriages, and tuft-yarn carriers or needles therein, the evener $146^×$ being moved positively to push all the dropped needles forward toward the cloth-making point and against the evener 146, the latter, after the said carriers or needles are in line, traveling in unison with the evener $146^×$ during its further forward movement, substantially as described.

7. The evener-carrying arms 25, having the extensions 153, the springs 147, the evener-carrying arms $25^×$, means to actuate the same, the tuft-yarn carriers or needles, the pocketed carriages and shaft $a'$, combined with stop-motion mechanism located between the said extensions and the said shaft and actuated by the said extensions to stop the loom when two tuft-yarn carriers or needles are dropped from below one and the same carriage when the eveners are separated, substantially as described.

8. The lift-frame 18 and its attached stands $p$, having wings provided with projections 150 and with stops $t^2$, combined with the evener-carrying levers 25, and pawls carried thereby to engage the said projections and hold the said arms and evener forward, substantially as described.

9. The top hook-board and the bottom hook-board and the Jacquard needles, combined with the series of hooks and the hook-locking board, to operate substantially as described.

10. The top hook-board having the bars 100, the hooks G, their attached tail-cords, and carriers $c$, combined with the hook-locking board having bars to act upon the series of hooks and keep in engagement with the said bars the hooks connected to the carriers not to be used, substantially as described.

11. The top board having the bars or griffs 100, the series of hooks G, adapted to be engaged by the said bars, a series of tuft-yarn carriers connected to the said hooks, a hook-locking board having bars 110 to act upon part of the hooks G, combined with an independent bar $110^×$, and means to actuate it independently of the bars 110, whereby one row of hooks may be kept from engagement with the bars 100 of the top board as when one row of tuft-carrying needles connected to said hooks are to be operated independently of the other rows to form a border, substantially as described.

12. The top board having the bars or griffs 100, the series of hooks G, adapted to be engaged by the said bars, a series of tuft-yarn carriers connected to the said hooks, and a hook-locking board having bars 110 to act upon part of the hooks G, combined with an independent bar $110^×$ and means to actuate it independently of the bars 110, whereby one row of hooks may be kept from engagement with the bars 100 of the top board, as when one row of tuft-carrying needles connected to said hooks are to be operated independently of the other rows to form a border, substantially as described.

13. The top hook-board having bars to be engaged by the hooks, the bottom hook-board having a series of bars, the series of hooks having eyes at their lower extremity and shoulders 163 above said eyes, and a guide portion, substantially as described, above said shoulders, the shoulders being extended laterally away from the said eyes, combined with the hook-guide board to prevent the hooks from being twisted or turned aside, substantially as described.

14. The top hook-board combined with the hook-locking board having bars 110, the pivoted arms supporting it, the rock-shaft 107, connections between it and the said locking-board, and means to actuate the said rock-shaft, substantially as described.

15. The top hook-board and the hook-locking board suspended below it, and means to actuate it, combined with the rock-shaft 137, the bar $110^×$, connected to the said rock-shaft, and means to actuate it, as described.

16. The top hook-board, the hook-guide board, and the bottom hook-board having concaved or recessed bars 164, combined with the series of hooks having shoulders between their upper ends 135 and their eyes $s'$ to enter the recesses of the said bars, substantially as described.

17. A series of hooks, their connected tail-cords, a top board having a series of griffs or blades to engage the said hooks, and an independently-acting locking-bar and means to support and operate the same to cause the hooks acted upon by it to be retained in engagement with one of the said griffs or blades, as desired, substantially as described.

18. The top board, the series of hooks, the bottom hook-board, the tail-cords, the guide-board H' for the tail-cords, the nib-board, the series of tuft-yarn carriers or needles, and the lifting-frame, including bars 18 and slide bars or rods $E^2$, jointed together substantially in line with the guide-board H', the latter and the nib-board being carried by the parts 18 of the lifting-frame, whereby wear on the tail-cords and guide-boards is prevented during the swinging movement of the lifting-frame, substantially as described.

19. The evener-bar 25, having the extension 153, the lifting-frame, the arm $c^{22}$, carried thereby and adapted to be acted upon by the said extension, combined with the shaft $c^{20}$, lever $c^{21}$, the arms $c^{19}$, the leg $c^{16}$, having a shoulder or projection to be engaged by the said arm, the block $a^{34}$, and a vibrator to engage the lower end of the said leg when the latter is dropped, substantially as described.

20. The sliding block $a^{34}$, the leg $c^{16}$, guided therein, and holding means to keep the said leg elevated above the lower side of the said block except when two tuft-yarn carriers or needles are dropped into operative position below one pocketed carriage, combined with a vibrator, the swing-frame 18, the evener-frame 25 and the extension 153 carried by it, the arm $c^{22}$, and means between it and the devices for holding up the said leg to effect the release of the said leg, substantially as and for the purpose described.

21. The sliding block $a^{34}$ and the leg $b^{18}$, guided thereby and having its end kept above the under side of the said block as long as the selvage-shuttle thread is being properly delivered, combined with the vibrator $b^{17}$, the rock-shaft $b^{22}$, to which the said leg is operatively joined, the thread-controller $b^{25}$, and intermediate connections between it and the said rock-shaft, to operate substantially as described.

22. The sliding block $a^{34}$, having an opening for the reception of one or more legs and having a hole at or near its inner end, and the vibrator $b^{17}$, combined with the locking-rod $a^{30}$, the rock-shaft $a'$, and connections between it and the said rod, to operate substantially as described.

23. The sliding block $a^{34}$, the rod $a^{30}$, the shaft $a'$, and connections between the said rod and shaft, combined with the brake-wheel, the lever $d^{16}$, and connections between it and the said shaft, to operate substantially as described.

24. The block $a^{34}$ to guide the stop-motion legs, and the shaft $b^{12}$, having the arm $b^{13}$, and the vibrator $b^{17}$, combined with the wheel $b^{15}$, having a cam projection to act on the said arm and rock the said shaft, to operate substantially as described.

25. The Jacquard cylinder $G^3$, the rods J, the rock-shaft $J^2$, its attached arms, the rods $J^5$ $J^9$, lever 64, and cam $F^{12}$, combined with the radius-bars $J^6$ $J^8$ and the hand-lever $J^{14}$, having a finger $J^{15}$ to lock the two radius-bars together or to disconnect one from the other to enable the rock-shaft to be actuated through the lever 64 or by the hand-lever while the loom is at rest, substantially as described.

26. The lower hook-board F, the arms $F^6$, connections between the said arms and the said hook-board, the rock-shaft $F^7$, the link $F^8$, the lever 43, and cam to move it, combined with the hand-lever $F^{10}$, to operate substantially as described.

27. The combination, with the selvage-shuttle race, of the selvage-shuttle-thread controller $b^{25}$, a cam, and intermediate devices to move the thread-controller in one direction, of a spring $b^{75}$ to move it in the opposite direction, substantially as described.

28. The selvage-shuttle race and the selvage-shuttle-thread controller $b^{25}$, combined with the rock-shaft $b^{22}$ and intermediate connections, substantially as described.

29. The combination, with cutters to cut the tuft-yarns and leave loops thereof in the fabric, of a cloth-lifting board and operating means therefor to automatically lift the cloth into a predetermined position preparatory to cutting off the tuft-yarn, for the purposes set forth, substantially as described.

30. The cutter-carrying levers $K^7$ $K^8$, having a common center of vibration, and their attached blades, combined with means to vibrate both the said levers toward and from each other, substantially as described.

31. The cutter-carrying levers $K^7$ $K^8$, pivots $K^6$, means to move the said levers, and arms $K^2$ for holding the said pivots, combined with means to adjust the said arms, substantially as described.

32. The cutter-carrying levers $K^7$ $K^8$, pivots $K^6$, and arms $K^2$, holding the said pivots, combined with means to adjust the said arms and with means to adjust the cutter $K^9$ on the levers $K^7$, substantially as described.

33. The tuft-yarn carriers, pocketed carriages in which they are guided, means to support and operate the said carriages, a jacquard to control the selection of the said needles, and a cloth-lifting device, combined with levers $K^7$ $K^8$, having cutters or blades, and with means to vibrate said levers, substantially as described.

34. The tuft-yarn needle having a yarn-receiving eye 400 and made hollow or tubular from at or near said eye to its lower end and provided with one or more yarn-detaining devices, substantially as described.

35. The levers 25 and $25^\times$, arranged in pairs, their connecting-springs 147, and the broad evener-plates 146 and $146^\times$, combined with the pocketed carriages, frame 18, and connected stands and tracks, and tuft-yarn carriers or needles in said carriages, the said eveners being wide enough to extend under the pockets and stand below the said carriers or needles, which are not to be used in the row of tufts then to be made, substantially as described.

36. A series of tuft-yarn carrying needles having their yarn-receiving eyes 400 arranged at different distances from their lower ends and made tubular from the said eyes to their lower ends, to thereby prevent the rubbing together of the tuft-yarns while the said tuft-yarn carriers are being moved or selected, substantially as described.

37. The herein-described tuft-yarn carrier, having a tubular portion to receive the tuft-yarns and provided at its interior with projections to produce friction upon the tuft-yarn, and with points, as 152, to enter the tuft-yarn, the said points being directed toward the delivery end of the said tuft-yarn carriers, substantially as described.

In testimony whereof we have signed our names to this specification in the presence of two subscribing witnesses.

HORACE WYMAN.
    JOHN A. CLARK.

Witnesses:
 JUSTIN A. WARE,
 SAMUEL B. SCHOFIELD.